US012475942B2

(12) United States Patent
Chiang et al.

(10) Patent No.: US 12,475,942 B2
(45) Date of Patent: Nov. 18, 2025

(54) INTEGRATED CIRCUIT STRUCTURE WITH COMPLEMENTARY FIELD EFFECT TRANSISTOR AND MEMORY CELL AND METHOD OF MAKING THEREOF

(71) Applicant: Taiwan Semiconductor Manufacturing Company, Ltd., Hsinchu (TW)

(72) Inventors: Hung-Li Chiang, Taipei (TW); Jer-Fu Wang, Taipei (TW); Iuliana Radu, Hsinchu County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 92 days.

(21) Appl. No.: 18/170,462

(22) Filed: Feb. 16, 2023

(65) Prior Publication Data

US 2024/0185913 A1 Jun. 6, 2024

Related U.S. Application Data

(60) Provisional application No. 63/429,515, filed on Dec. 1, 2022.

(51) Int. Cl.
*H10B 53/00* (2023.01)
*G11C 11/412* (2006.01)
*H01L 23/48* (2006.01)
*H10B 10/00* (2023.01)
*H10D 30/67* (2025.01)
*H10D 64/01* (2025.01)

(52) U.S. Cl.
CPC .......... *G11C 11/412* (2013.01); *H01L 23/481* (2013.01); *H10B 10/125* (2023.02); *H10D 30/6729* (2025.01); *H10D 30/6735* (2025.01); *H10D 30/6757* (2025.01); *H10D 64/017* (2025.01)

(58) Field of Classification Search
CPC ......... H10B 53/00; H10B 61/00; H10B 63/00
See application file for complete search history.

(56) References Cited

U.S. PATENT DOCUMENTS

| 5,923,184 | A | * | 7/1999 | Ooms | ............... | H03K 19/08 |
|           |   |   |        |      |                 | 326/50 |
| 9,209,247 | B2 |   | 12/2015 | Colinge et al. | | |
| 9,236,267 | B2 |   | 1/2016 | De et al. | | |
| 9,412,817 | B2 |   | 8/2016 | Yang et al. | | |
| 9,412,828 | B2 |   | 8/2016 | Ching et al. | | |

(Continued)

*Primary Examiner* — Hoai V Ho
(74) *Attorney, Agent, or Firm* — JCIPRNET

(57) ABSTRACT

A memory device and a semiconductor die are provided. The memory device includes: a non-volatile storage device, with a first terminal coupled to a bit line; and an access transistor, configured to control electrical connection between a second terminal of the non-volatile storage device and a source line, and comprising an N-type field effect transistor (NFET) and a P-type field effect transistor (PFET) stacked on the NFET. A common source/drain terminal of the NFET and the PFET is coupled to the second terminal of the non-volatile storage device. Another common source/drain terminal of the NFET and the PFET is coupled to the source line. Further, gate terminals of the NFET and the PFET are coupled to different word lines.

20 Claims, 12 Drawing Sheets

(56) References Cited

U.S. PATENT DOCUMENTS

| | | | |
|---|---|---|---|
| 9,472,618 B2 | 10/2016 | Oxland | |
| 9,502,265 B1 | 11/2016 | Jiang et al. | |
| 9,520,482 B1 | 12/2016 | Chang et al. | |
| 9,536,738 B2 | 1/2017 | Huang et al. | |
| 9,576,814 B2 | 2/2017 | Wu et al. | |
| 9,608,116 B2 | 3/2017 | Ching et al. | |
| 2018/0122467 A1* | 5/2018 | Pyo | G11C 13/0069 |
| 2021/0043630 A1* | 2/2021 | Liebmann | H10D 84/038 |
| 2022/0181322 A1* | 6/2022 | Liebmann | H10D 30/6735 |

* cited by examiner

INTEGRATED CIRCUIT STRUCTURE WITH COMPLEMENTARY FIELD EFFECT TRANSISTOR AND MEMORY CELL AND METHOD OF MAKING THEREOF

CROSS-REFERENCE TO RELATED APPLICATION

This application claims the priority benefit of U.S. Provisional application Ser. No. 63/429,515, filed on Dec. 1, 2022. The entirety of the above-mentioned patent application is hereby incorporated by reference herein and made a part of this specification.

BACKGROUND

Modern integrated circuits contain electronic memory for data storage. Electronic memory includes volatile memory and non-volatile memory. Non-volatile memory is able to store data even in absence of power supply, and may have greater storage capacity in a given area as compared to volatile memory. Each cell in non-volatile memory includes a storage unit and an access transistor coupled to this storage unit. In general, an N-type field effect transistor (NFET) is used as the access transistor. Although being able to transmit a strong logic low voltage, NFET may only pass weak logic high voltage. As a consequence, set and reset operations of the storage unit cannot be both optimized.

On the other hand, despite incapability of storing data in absence of power supply, volatile memory has merit in access speed. Static random access memory (SRAM) is a comprehensively used volatile memory, and often operated as a cache memory. Pairs of NFET and P-type field effect transistor (PFET) are required to form each SRAM cell. As the NFETs and the PFETs of the SRAM cells are deployed on the same plane, SRAM needs a large chip area. In addition to further reducing feature size of the NFETs and PFETs, more innovative solutions for further scaling SRAM are in demand for current and future technology nodes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
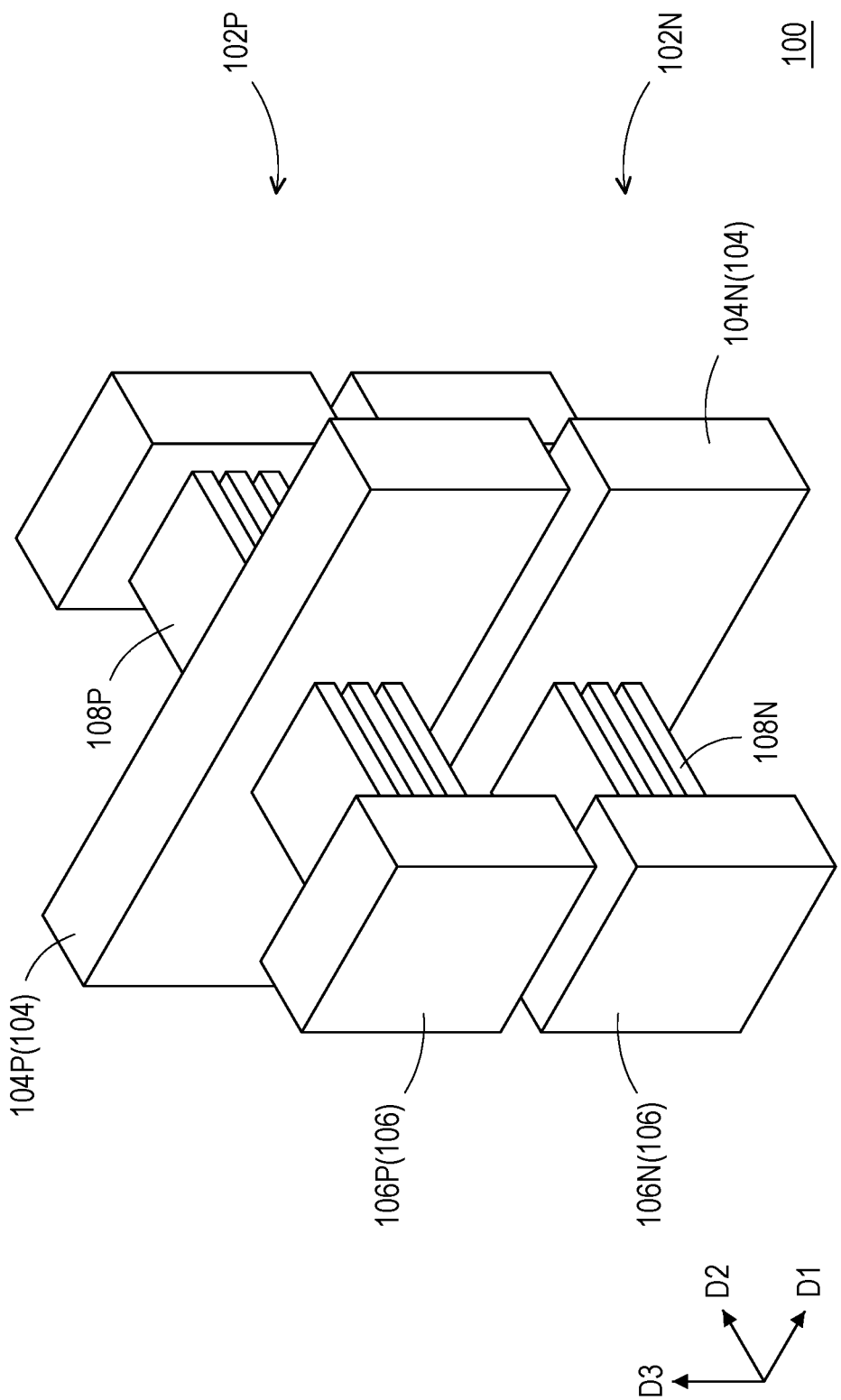
FIG. 1A is a schematic three-dimensional view illustrating a CFET, according to some embodiments of the present disclosure.

The following disclosure provides many different embodiments or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A complementary field effect transistor (CFET) including vertically stacked NFET and PFET is used for an access transistor coupled to a storage unit in each cell of a non-volatile memory, to ensure both set and reset voltages of the storage unit. Further, the CFET is used for each pair of NFET and PFET in each SRAM cell, for significantly reducing footprint area of each SRAM cell.

FIG. 1A is a schematic three-dimensional view illustrating a CFET 100, according to some embodiments of the present disclosure.

Referring to FIG. 1A, the CFET 100 includes an NFET 102N and a PFET 102P stacked on the NFET 102N. The NFET 102N and the PFET 102P respectively include a gate structure 104 as a gate terminal; and a pair of source/drain contacts 106 as source and drain terminals and located at opposite sides of the gate structure 104. Interchangeably, while one a pair of source/drain contacts in a NFET/PFET is function as a source terminal, the other one of the source/drain contacts is functioned as the drain terminal. The gate structure 104 of the NFET 102N is also referred to as a gate structure 104N, while the gate structure 104 of the PFET 102P is also referred to as a gate structure 104P. In a similar way, the source/drain contacts 106 of the NFET 102N are also referred to as source/drain contacts 106N, and the source/drain contacts 106 of the PFET 102P are also referred to as source/drain contacts 106P.

As the NFET 102N lies below the PFET 102P, the gate structure 104N and the source/drain contacts 106N of the NFET 102N are disposed at a horizontal level lower than a horizontal level at which the gate structure 104P and the source/drain contacts 106P of the PFET 102P lie. In some embodiments, the gate structure 104N is overlapped with the gate structure 104P, and the source/drain contacts 106N are overlapped with the source/drain contacts 106P. In these embodiments, a total footprint area of the NFET 102N and the PFET 102P can be minimized. As compared to an integrated circuit formed of NFETs and PFETs deployed at the same horizontal level, an integrated circuit including a plurality of the CFETs 100 each having the overlapped NFET 102N and PFET 102P may have a much greater integration density.

In some embodiments, the NFET 102N and the PFET 102P are respectively a gate-all-around field effect transistor (GAAFET). In these embodiments, the NFET 102N includes channel structures 108N separately extending through the gate structure 104N and in lateral contact with the source/drain contacts 106N. Portions of the channel structures 108N embedded in the gate structure 104N are wrapped all around by the gate structure 104N. The source/drain contacts 106N can be switchably in electrical connection through the channel structures 108N, and switching of such electrical connection can be controlled by the gate structure 104N. The channel structures 108N are formed of a semiconductor material (e.g., crystalline silicon), and may or may not be doped with P-type dopants. In some embodiments, the channel structures 108N are formed as thin sheets vertically separated from one another and each regarded a two-dimensional structure with major planar surfaces substantially parallel with a top surface of a semiconductor substrate (e.g., the semiconductor substrate 110 to be described with reference to FIG. 1B and FIG. 1C) supporting the CFET 100. As the gate structure 104N extends along a first lateral direction D1, the channel structures 108N may extend along a second lateral direction D2 intersected with (e.g., substantially perpendicular to) the first lateral direction D1, and are stacked along a substantially vertical direction D3. Further, the major planar surfaces of the channel structures 108N may span along the first lateral direction D1 and the second lateral direction D2. Although the NFET 102N is depicted as having 3 of the channel structures 108N, those skilled in the art can adjust an amount of the channel structures 108N according to circuit design, the present disclosure is not limited thereto.

Similarly, in those embodiments where the NFET 102N and the PFET 102P are respectively a GAAFET, the PFET 102P includes channel structures 108P separately extending through the gate structure 104P, and in lateral contact with the source/drain contacts 106P. Portions of the channel structures 108P embedded in the gate structure 104P are wrapped all around by the gate structure 104P. The source/drain contacts 106P can be switchably in electrical connection through the channel structures 108P, and switching of such electrical connection can be controlled by the gate structure 104P. In those embodiments where the gate structure 104P and the source/drain contacts 106P overlap the gate structure 104N and the source/drain contacts 106N, the channel structures 108P may overlap the channel structures 108N as well. As similar to the channel structures 108N, the channel structures 108P are formed of a semiconducting material (e.g., crystalline silicon), and formed as thin sheets vertically separated from one another and each regarded a two-dimensional structure with major planar surfaces substantially parallel with a top surface of a semiconductor substrate (e.g., the semiconductor substrate 110 to be described with reference to FIG. 1B and FIG. 1C) supporting the CFET 100. In those embodiments where the gate structure 104P extends along the first lateral direction D1, the channel structures 108P may extend along the second lateral direction D2, and are stacked along the substantially vertical direction D3. In some embodiments, the channel structures 108P are further doped with N-type dopants. In alternative embodiments, the channel structures 108P are intrinsic. Although the PFET 102P is depicted as having 3 of the channel structures 108P, those skilled in the art can adjust the amount of the channel structures 108P according to circuit design, the present disclosure is not limited thereto.

Figure 1B:
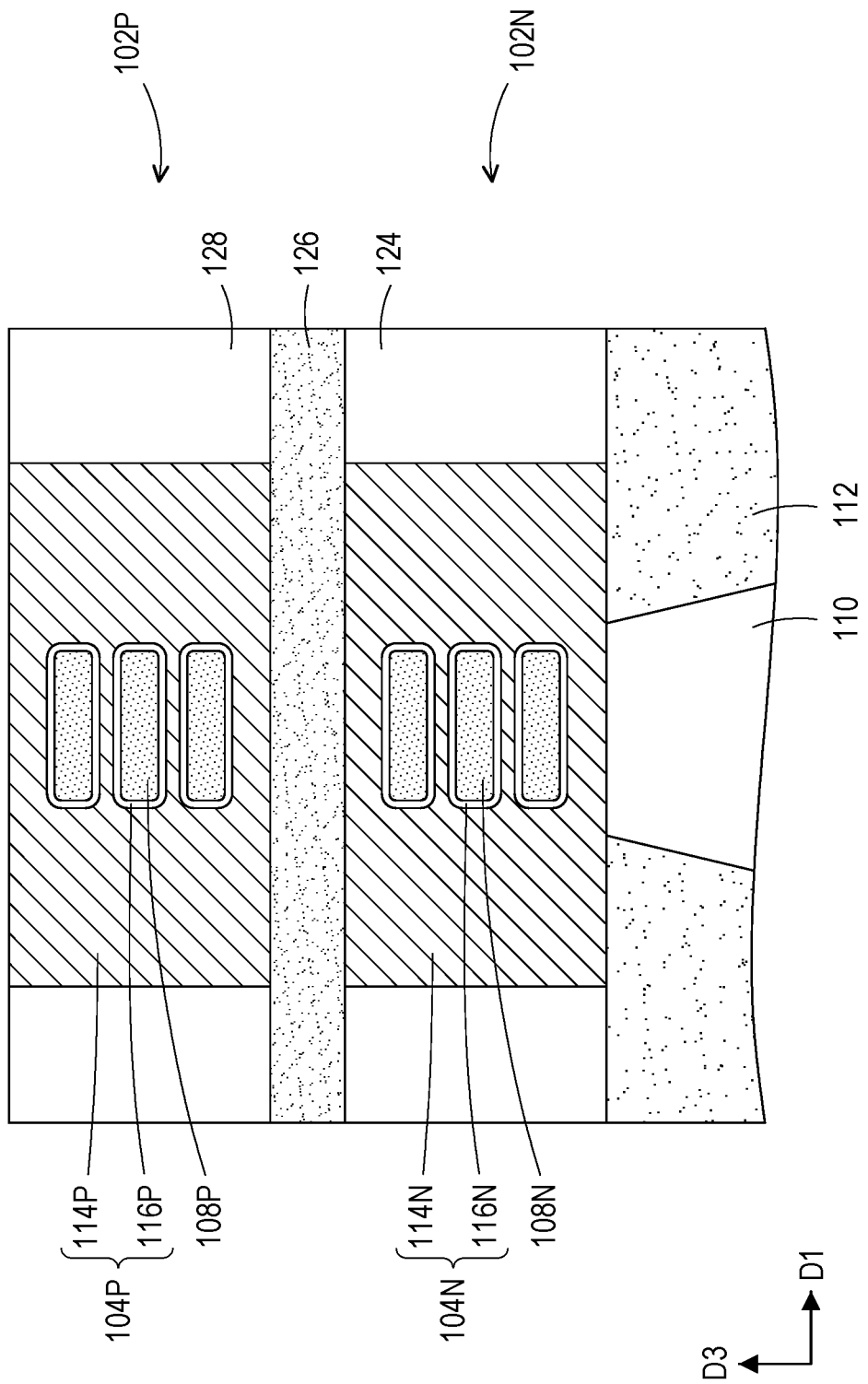
FIG. 1B is a schematic cross-sectional view along gate structures of the CFET, according to some embodiments of the present disclosure.
Figure 1C:
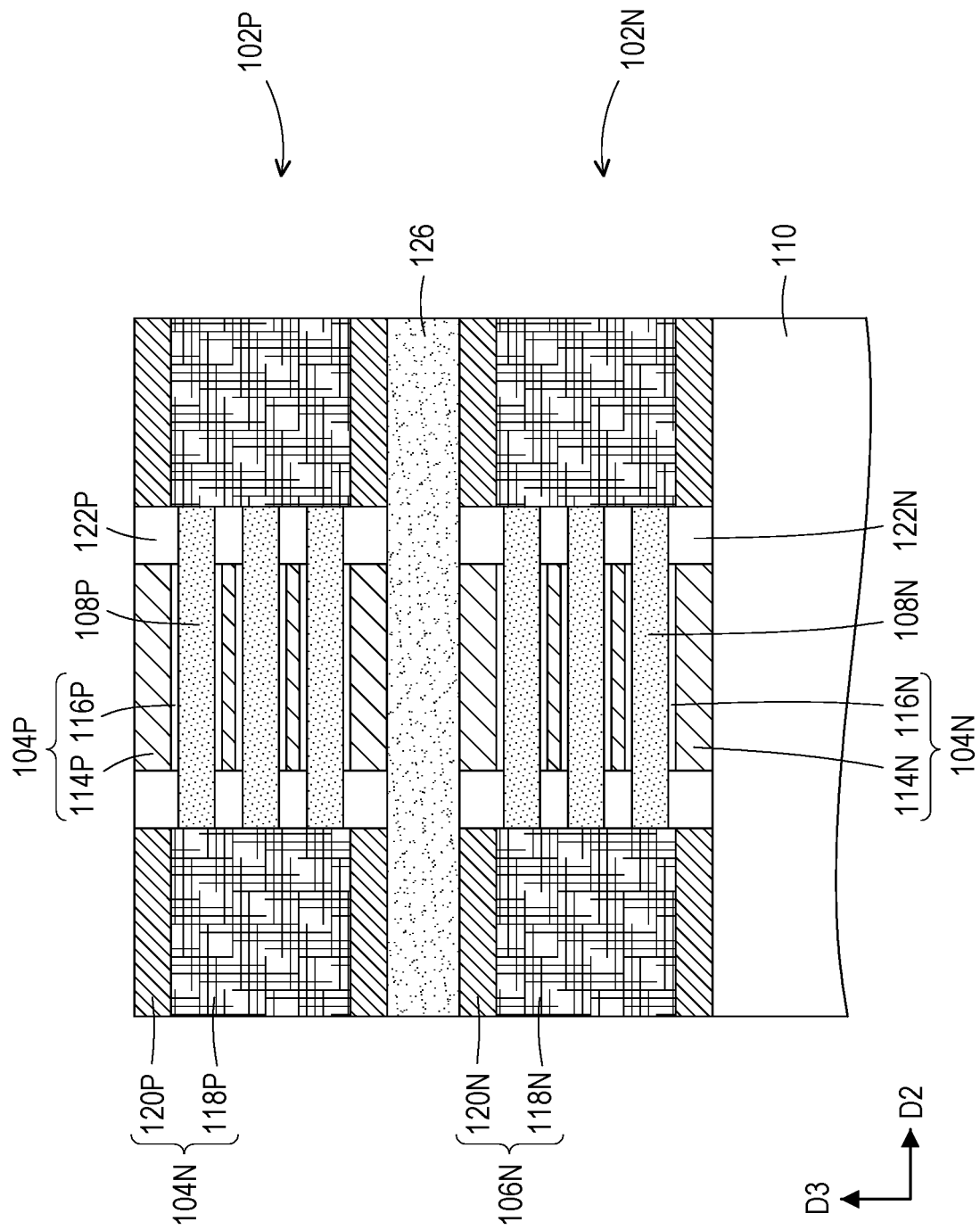
FIG. 1C is a schematic cross-sectional view along channel structures of the CFET, according to some embodiments of the present disclosure.

FIG. 1B is a schematic cross-sectional view along the gate structures 104N, 104P of the NFET 102N and the PFET 102P, according to some embodiments of the present disclosure. FIG. 1C is a schematic cross-sectional view along the channel structures 108N, 108P of the NFET 102N and the PFET 102P, according to some embodiments of the present disclosure.

Referring to FIG. 1B and FIG. 1C, the NFET 102N and the PFET 102P are built on a semiconductor substrate 110, such as a silicon wafer. As shown in FIG. 1B, an isolation structure 112 is formed into the semiconductor substrate 110 for defining a base region on which the channel structures 108N of the NFET 102N are formed. The base region, which is a portion of the semiconductor substrate 110, may extend along the channel structures 108N, 108P of the NFET 102N and the PFET 102P, as indicated in FIG. 1B and FIG. 1C.

The channel structures 108N of the NFET 102N may be elevated from a top surface of the semiconductor substrate 110, and are wrapped all around by the gate structure 104N of the NFET 102N. The gate structure 104N may include a gate electrode 114N intersected with and penetrated through by the channel structures 108N, and include gate dielectric layers 116N separating the channel structures 108N from the gate electrode 114N. Although not shown, work function layer(s) and barrier metal layer(s) may lie between the gate electrode 114N and the gate dielectric layers 116N, and interfacial layers may respectively extend between one of the channel structures 108N and the covering gate dielectric layer 116N.

As shown in FIG. 1C, the channel structures 108N are in lateral contact with the source/drain contacts 106N. In some embodiments, each source/drain contact 106N includes an epitaxial structure 118N grown from the channel structures 108N, and includes a contact structure 120N covering the epitaxial structure 118N. In some cases, the epitaxial structure 118N may not extend down to the semiconductor substrate 110, and a portion of the contact structure 120N may be filled between the epitaxial structure 118N and the semiconductor substrate 110. In other cases, a bottom surface of the epitaxial structure 118N may be in contact with the semiconductor substrate 110 without the contact structure 120N in between. Further, in some embodiments, the contact structure 120N is formed to a height substantially leveled with a top end of the gate structure 104N.

The gate structure 104N (i.e., the gate electrode 114N of the gate structure 104N) is isolated from the source/drain contacts 106N. In some embodiments, a sidewall spacer 122N is provided along opposite sides of the gate structure 104N, for ensuring electrical isolation between the gate structure 104N and the source/drain contacts 106N. End portions of the channel structures 108N extending between the gate structure 104N and the source/drain contacts 106N are wrapped around by the sidewall spacer 122N. In some embodiments, a top end of the sidewall spacer 122N is substantially leveled with the top ends of the gate structure 104N and the source/drain contacts 106N.

Moreover, as indicated by FIG. 1B, the NFET 102N is embedded in a dielectric layer 124. In some embodiments, a top surface of the dielectric layer 124 is substantially leveled with the top end of the gate structure 104N, as well as the top ends of the sidewall spacer 122N and the source/drain contacts 106N (shown in FIG. 1C). According to some embodiments, an insulating spacer layer 126 is provided to separate the NFET 102N at a ground level from the PFET 102P at an elevated level. In these embodiments, the spacer layer 126 may extend along top surfaces of the gate structure 104N, the sidewall spacer 122N, the source/drain contacts 106N and the dielectric layer 124, and the PEFT 102P is built on the spacer layer 126.

The channel structures 108P of the PFET 102P may be elevated from a top surface of the spacer layer 126, and are wrapped around by the gate structure 104P of the PFET 102P. As similar to the gate structure 104N of the NFET 102N, the gate structure 104P may include a gate electrode 114P intersected with and penetrated through by the channel structures 108P, and include gate dielectric layers 116P separating the channel structures 108P from the gate electrode 114P. According to some embodiments, the gate electrode 114P may be formed of a conductive material different from a conductive material for forming the gate electrode 114N of the gate structure 104N in the NFET 102N. In alternative embodiments, the gate electrodes 114N, 114P are formed of the same conductive material. Although not shown, work function layer(s) and barrier metal layer(s) may lie between the gate electrode 114P and the gate dielectric layers 116P, and interfacial layers may respectively extend between one of the channel structures 108P and the covering gate dielectric layer 116P.

As shown in FIG. 1C, the channel structures 108P are in lateral contact with the source/drain contacts 106P. In some embodiments, each source/drain contact 106P includes an epitaxial structure 118P grown from the channel structures 108P, and includes a contact structure 120P covering the epitaxial structure 118P. In terms of material, the epitaxial structure 118P may be different from the epitaxial structure 118N in each source/drain contact 106N of the NFET 102N. For instance, the epitaxial structure 118N may be formed of silicon carbide, while the epitaxial structure 118P may be formed of silicon germanium. Alternatively, the epitaxial structures 118N, 118P may be formed of the same material. In addition, in some cases, the epitaxial structure 118P may not extend down to the spacer layer 126, and a portion of the contact structure 120P may be filled between the epitaxial structure 118P and the spacer layer 126. In other cases, a bottom surface of the epitaxial structure 118P may be in contact with the spacer layer 126 without the contact structure 120P in between. Further, in some embodiments, the contact structure 120P is formed to a height substantially leveled with a top end of the gate structure 104P.

The gate structure 104P (i.e., the gate electrode 114P of the gate structure 104P) is isolated from the source/drain contacts 106P. In some embodiments, a sidewall spacer 122P is provided along opposite sides of the gate structure 104P, for ensuring electrical isolation between the gate structure 104P and the source/drain contacts 106P. End portions of the channel structures 108P extending between the gate structure 104P and the source/drain contacts 106P are wrapped around by the sidewall spacer 122P. In some embodiments, a top end of the sidewall spacer 122P is substantially leveled with the top ends of the gate structure 104P and the source/drain contacts 106P.

Further, as indicated by FIG. 1B, the PFET 102P is embedded in a dielectric layer 128 formed on the spacer layer 126. The gate structure 104P along with the sidewall spacer 122P and the source/drain contacts 104P (shown in FIG. 1C) are laterally surrounded by the dielectric layer 128. In some embodiments, a top surface of the dielectric layer 128 is substantially leveled with the top ends of the gate structure 104P, the sidewall spacer 122P and the source/drain contacts 106P.

Although not shown, more of the CFETs 100 may be formed on the semiconductor substrate 110, and an interconnection structure may be formed on the CFETs 100 for routing the NFETs 102N and the PFETs 102P in the CFETs 100. Depending on circuit design, the gate structures 104N, 104P in each CFET 100 may be optionally connected through a conductive via extending through the spacer layer 126. Also, as an option, additional conductive via(s) penetrating through the spacer layer 126 may be used for establishing electrical connection from one of the source/drain contacts 106N of the NFET 102N to one of the source/drain contacts 106P of the PFET 102P in each CFET 100, or from both of the source/drain contacts 106N to both of the source/drain contacts 106P in each CFET 100. Further, some of the CFETs 100 may be powered by buried power rails embedded in the isolation structure 112 or power rails formed in the interconnection structure stacked over the CFETs 100.

As an application, some of the CFETs 100 are used as access transistors of a non-volatile memory array.

Figure 2A:
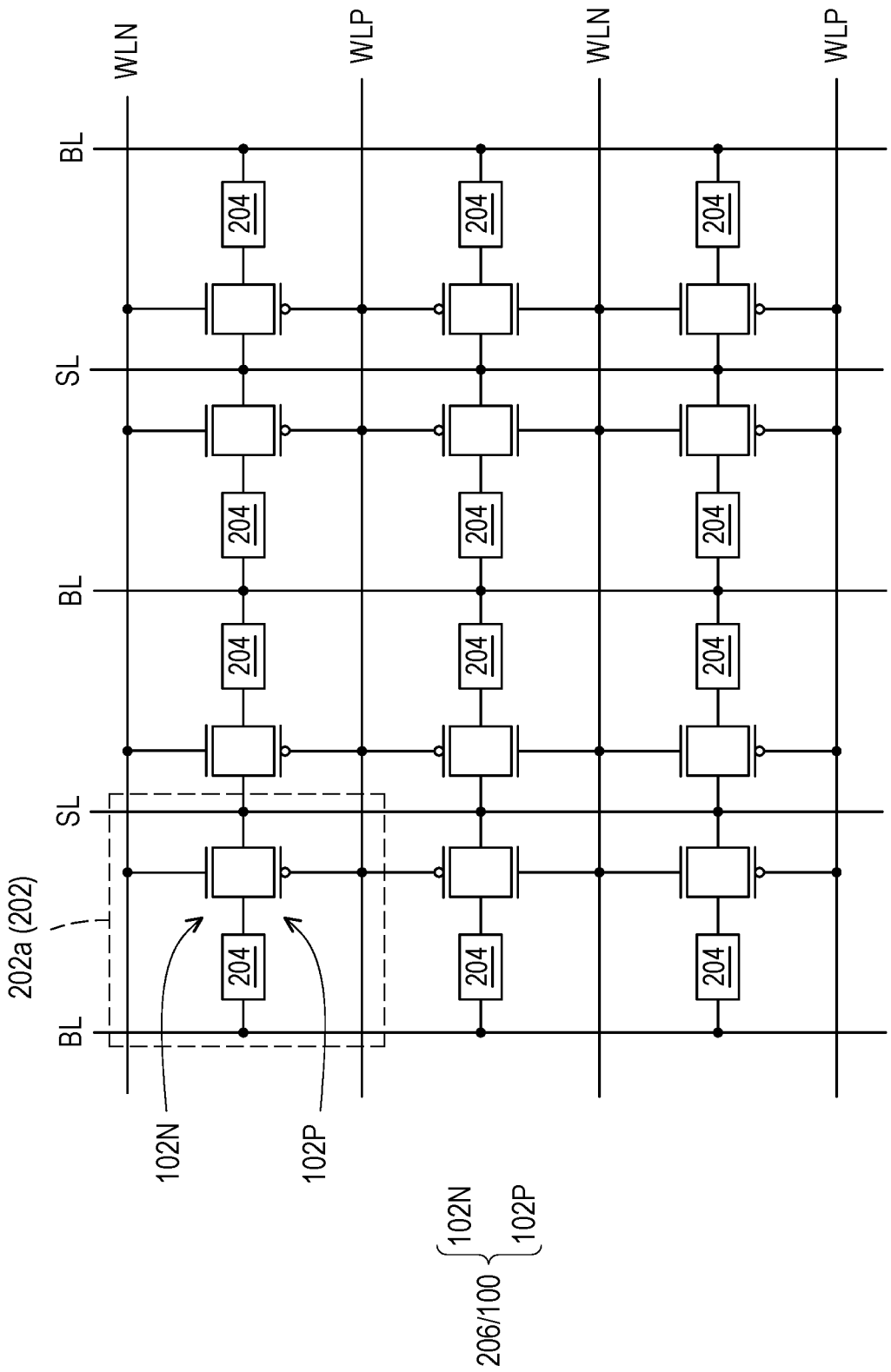
FIG. 2A is a circuit diagram illustrating a non-volatile memory array, according to some embodiments of the present disclosure.

FIG. 2A is a circuit diagram illustrating a non-volatile memory array 200, according to some embodiments of the present disclosure.

Referring to FIG. 2A, the non-volatile memory array 200 includes memory cells 202 arranged along rows and columns. Each memory cell 202 includes a storage device 204 and an access transistor 206 coupled to the storage device 204. The storage device 204 is a two-terminal device. Logic data can be written to the storage device 204 by controlling a voltage bias across the storage device 204. When the voltage bias is provided with a first polarity, a logic "1" data can be stored into the storage device 204. On the other hand, when the voltage is provided with a second polarity opposite to the first polarity, a logic "0" data can be programmed into the storage device 204. In some embodiments, the storage device 204 is a resistive storage device. As examples, a variable resistor in each cell of a resistive random access memory (RRAM), a variable resistor in each cell of a phase change random access memory (PCRAM) or a magnetic tunneling junction (MTJ) in each cell of a magnetoresistive random access memory (MRAM) may be provided as the resistive storage device. In other embodiments, the storage device 204 is a capacitive storage device. For instance, a variable ferroelectric capacitor in each cell of a ferroelectric random access memory (FeRAM) may be provided as the capacitive storage device.

Bit lines BL and source lines SL arranged in pairs run across the non-volatile memory array 200 along a column direction. The memory cells 202 in the same column may be connected to the bit line BL and source lines SL in the same pair. In each memory cell 202, the access transistor 206 is used for controlling coupling between a terminal of the storage device 204 and the connected source line SL, while the other terminal of the storage device 204 may be directly coupled to the connected bit line BL. By controlling switching of the access transistor 206, the storage device 204 in a memory cell 202 can be programmed by a voltage difference between the connected bit line BL and source line SL only when the memory cell 202 is selected. As the bit lines BL and the source lines SL are alternately arranged along a row direction, adjacent columns of the memory cells 202 may share the bit line BL or source line SL extending in between. Further, in terms of circuit and layout, the memory cells 202 in each column may be in mirror symmetry to the memory cells 202 in an adjacent column, with respect to the bit line BL or source line SL extending in between.

The access transistor 206 in each memory cell 202 is provided by a transmission gate formed of the CFET 100 described with reference to FIG. 1A through FIG. 1C. To form a transmission gate, the NFET 102N and the PFET 102P in the CFET 100 are connected with each other via source and drain terminals (i.e., the source/drain contacts 106N, 106P). One of the source/drain terminal of the NFET 102N and one of the source/drain terminals of the PFET 102P are connected to one of the terminals of the storage device 204, while the other source/drain terminal of the NFET 102N and the other source/drain terminal of the PFET 102P are coupled to the connected source line SL. On the other hand, gate terminals of the NFET 102N and the PFET 102P (i.e., the gate electrodes 114N, 114P of the gate structures 104N, 104P) are connected to word lines WLN, WLP, respectively. Multiple pairs of the word lines WLN, WLP run across the non-volatile memory array 200 along a row direction. The memory cells 202 in the same row may be connected to the same pair of the word lines WLN, WLP. As the word lines WLN and the word lines WLP are alternately arranged along the column direction, adjacent rows of the memory cells 202 may share the word line WLN/WLP extending in between. In terms of circuit (but not in layout), the memory cells 202 in each row may be in mirror symmetry to the memory cells 202 in an adjacent row, with respect to the word line WLN/WLP extending in between.

One of the memory cells 202, such as a memory cell 202a, is used for describing set and reset programming operations of each memory cell 202. A first terminal of the storage device 204 in the memory cell 202a is directly coupled to the connected bit line BL, whereas a second terminal of the storage device 204 is coupled to the connected source line SL through the access transistor 206 in between. As described, the access transistor 206 is formed by the CFET 100 including the NFET 102N and the PFET 102P stacked on the NFET 102N. A gate terminal of the NFET 102N is coupled to the connected word line WLN, and a gate terminal of the PFET 102P is coupled to the connected word line WLP.

During a set operation, the bit line BL may be coupled to a reference voltage (e.g., a ground voltage), while the source line SL may be coupled to a positive power supply voltage. Meanwhile, the word line WLN may receive a reference voltage (e.g., a ground voltage), while the word line WLP may receive a negative power supply voltage. In this way, the PFET 102P of the CFET 100 coupled to the word line WLP is turned on, while the NFET 102N of the CFET 100 coupled to the word line WLN is kept off. Accordingly, the positive power supply voltage received by the source line SL can be passed to the second terminal of the storage device 204 through the PFET 102P, with a headroom loss of a negative threshold voltage of the PFET 102P. In other words, a voltage at the second terminal of the storage device 204 would be a sum of the positive power supply voltage received by the source line SL and an absolute value of the negative threshold voltage of the PFET 102P. On the other hand, a voltage at the first terminal of the storage device 204 would be the reference voltage received by the bit line BL. Therefore, a magnitude of a voltage difference between the first and second terminals of the storage device 204 is greater than a difference between the positive power supply voltage and the reference voltage by an absolute value of the negative threshold voltage of the PFET 102P.

During a reset operation, the bit line BL may be coupled to a positive power supply voltage, while the source line SL may be coupled to a reference voltage (e.g., a ground voltage). Meanwhile, the word line WLN may receive a positive power supply voltage, while the word line WLP may receive a reference voltage (e.g., a ground voltage). In this way, the NFET 102N of the CFET 100 coupled to the word line WLN is turned on, whereas the PFET 102P of the CFET 100 coupled to the word line WLP is kept off. Accordingly, the reference voltage received by the source line SL can be passed to the second terminal of the storage device 204 through the NFET 102N, with a headroom loss of a positive threshold voltage of the NFET 102N. In other words, a voltage at the second terminal of the storage device 204 can be obtained by subtracting the positive threshold voltage of the NFET 102N from the reference voltage, and a negative voltage may be resulted at the second terminal of the storage device 204. On the other hand, a voltage at the first terminal of the storage device 204 would be the positive power supply voltage received by the bit line BL. Therefore, a magnitude of a voltage difference between the first and second terminals of the storage device 204 is greater than a difference between the positive power supply voltage and the reference voltage by the positive threshold voltage of the NFET 102N.

As described above, a voltage bias with a magnitude greater than a difference between a power supply voltage and a reference voltage can be applied across the storage device 204 in each of the set and reset operations. As compared to using a single NFET or a single PFET as an access transistor in each cell that results in reducing magnitude of a voltage bias applied across the coupled storage device either in a set operation or in a reset operation, using the CFET 100 as the access transistor 206 in each memory cell 202 can ensure writing ability in both set and reset operations, without raising the power supply voltage. Therefore, the non-volatile memory array 200 can be operated with improved power efficiency.

Figure 2B:
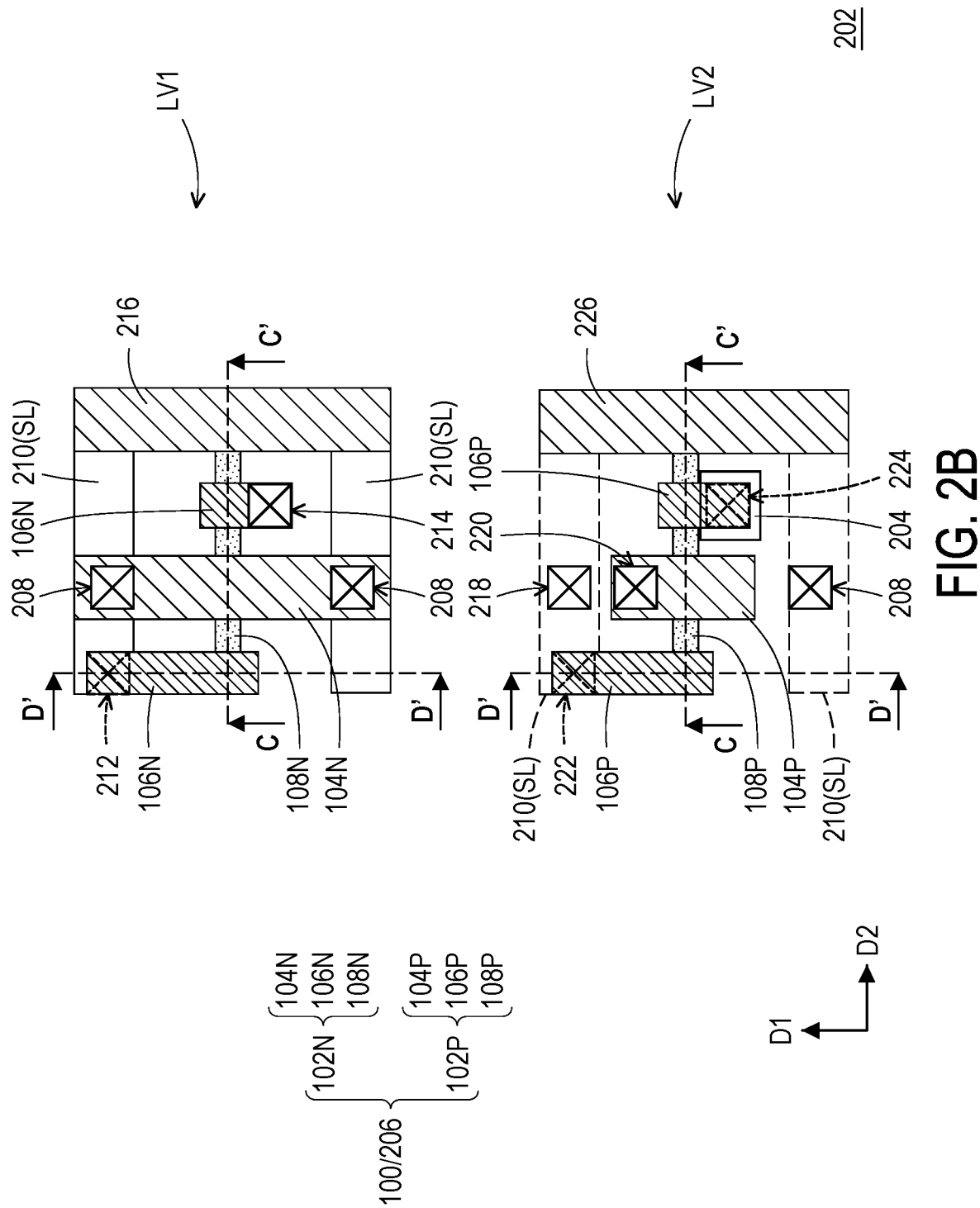
FIG. 2B illustrates a layout design of a memory cell in the non-volatile memory array, according to some embodiments of the present disclosure.

FIG. 2B illustrates a layout design of one of the memory cells 202 in the non-volatile memory array 200, according to some embodiments of the present disclosure.

As identical with others of the memory cells 202, the memory cell 202 shown in FIG. 2B is formed as a multi-story structure. A first sub-layout LV1 shows a portion of the memory cell 202 at a ground level, and a second sub-layout LV2 shows another portion of the memory cell 202 at an elevated level. In order to be illustrated individually, the first and second sub-layouts LV1, LV2 are depicted as being laterally offset from each other. However, the first sub-layout LV1 should actually lie below the second sub-layout LV2.

The CFET 100 is provided as the access transistor 206 of the memory cell 202. The NFET 102N in the CFET 100 is laid in the first sub-layout LV1 at the ground level. As described with reference to FIG. 1A, the NFET 102N includes the gate structure 104N, the source/drain contacts 106N and the channel structures 108N (which are depicted as a single element in FIG. 2B). According to some embodiments, the gate structure 104N may extend along the first lateral direction D1, and the channel structures 108N may extend along the second lateral direction D2, and penetrate through the gate structure 104N. The source/drain contacts 106N are laid at opposite sides of the gate structure 104N, and are respectively disposed at a break of the channel structures 108N. In this way, the source/drain contacts 106N are in lateral contact with the channel structures 108N.

Conductive vias 208 may separately stand on the gate structure 102N, and the gate structure 102N may be connected to an overlying word line WLN (not shown in FIG. 2B) through the conductive vias 208. One of the source/drain contacts 106N may be connected to a buried power rail 210 as one of the source lines SL described above. Another buried power rail 210 connected to an adjacent memory cell 202 extends along a boundary of the memory cell 202, and is also shown in FIG. 2B. As will be further described, the buried power rails 210 are embedded in the isolation structure 112 formed into the semiconductor substrate 110. In some embodiments, the buried power rails 210 extend along the second lateral direction D2 at opposite sides of the channel structures 108N. In these embodiments, the one of the source/drain contacts 106N may extend along the first lateral direction D1 to overlap the connected buried power rail 208, and a conductive via 212 may be used for connecting this source/drain contact 106N to the underlying buried power rail 210. On the other hand, the other source/drain contact 106N may be connected to one of the source/drain contacts 106P of the PFET 102P laid in the second sub-layout LV2 at the elevated level. A conductive via 214 may be used for connecting this source/drain contact 106N to the overlying source/drain contact 106P.

In some embodiments, a dummy gate structure 216 is disposed at the ground level for tuning patterning density and/or for cutting off sneak current travelling to an adjacent memory cell 202 through the channel structures 108N. The dummy gate structure 216 through which the channel structures 108N penetrate may be substantially parallel to the gate structure 104N, and one of the source/drain contacts 106N (e.g., the source/drain contact 106N on which the conductive via 214 is disposed) may be located between the dummy gate structure 216 and the gate structure 104N. A dummy transistor may be formed at an intersection of the dummy gate structure 216 and the channel structures 108N. According to some embodiments, the dummy gate structure 216 may receive a voltage signal that can ensure that the dummy transistor is kept off. In these embodiments, the sneak current travelling to an adjacent memory cell 202 through the channel structures 108N can be cut off. For instance, the dummy transistor may be an NFET, and the dummy gate structure 216 may be coupled to a ground voltage for preventing cross-talk between adjacent memory cells 202.

The PFET 102P laid in the second sub-layout LV2 at the elevated level includes the gate structure 104P, the source/drain contacts 106P and the channel structures 108P (which are depicted as a single element in FIG. 2B). In those embodiments where the underlying gate structure 104N extends along the first lateral direction D1 and the channel structures 108N extend along the second lateral direction D2, the gate structure 104P overlapping the gate structure 104N may also extend along the first lateral direction D1, and the channel structures 108P overlapping the channel structures 108N may extend along the lateral direction D2 as well, and laterally penetrate through the gate structure 104P. The source/drain contacts 106P are laid at opposite sides of the gate structure 104P, and are respectively disposed at a break of the channel structures 108P. In this way, the source/drain contacts 106P are in lateral contact with the channel structures 108P.

In some embodiments, the gate structure 104P is confined within the memory cell 202, rather than being shared with adjacent memory cells 202. In these embodiments, the gate structure 104P may extend between conductive vias 218 connected to the conductive vias 208 standing on the gate structure 104N at the ground level. The gate structure 104N at the ground level may be connected to an overlying word line WLN (not shown) through the conductive vias 208, 218. On the other hand, the gate structure 104P at the elevated level may be connected to an overlying word line WLP (also not shown) through a conductive via 220 standing on the gate structure 104P.

One of the source/drain contacts 106P may be connected to one of the source/drain contacts 106N of the NFET 102N at the ground level through a conductive via 222, and these connected source/drain contacts 106P, 106N may be further connected to the underlying buried power rail 210 through the conductive via 212. In addition, the other source/drain contact 106P may be connected to the other one of the source/drain contacts 106N through the conductive via 214, and may be connected to the storage device 204 formed at a further elevated level through a conductive via 224. Although not shown, the other terminal of the storage device 204 is connected to an overlying bit line BL.

In some embodiments, a dummy gate structure 226 is disposed at the elevated level for tuning patterning density and/or for cutting off sneak current travelling to an adjacent memory cell 202 through the channel structures 108P. The dummy gate structure 226 through which the channel structures 108P penetrate may be substantially parallel to the gate structure 104P, and the source/drain contact 106P connected to the overlying storage device 204 may be located between the dummy gate structure 226 and the gate structure 104P. A dummy transistor may be formed at an intersection of the dummy gate structure 226 and the channel structures 108P. According to some embodiments, the dummy gate structure 226 may receive a voltage signal that can ensure that the dummy transistor is kept off. In these embodiments, the sneak current travelling to an adjacent memory cell 202 through the channel structures 108P can be cut off. For instance, the dummy transistor may be a PFET, and the dummy gate structure 226 may be coupled to a ground voltage for preventing cross-talk between adjacent memory cells 202.

It should be appreciated that dielectric elements in the NFET 102N and the PFET 102P (e.g., the isolation structure 112, the sidewall spacers 122P, 122N) as well as the dielectric layers 124, 128 and the spacer layer 126 are omitted from illustration in FIG. 2B. Nevertheless, these dielectric elements are shown in the schematic cross-sectional views in FIG. 2C and FIG. 2D, along with other detailed structures.

Figure 2C:
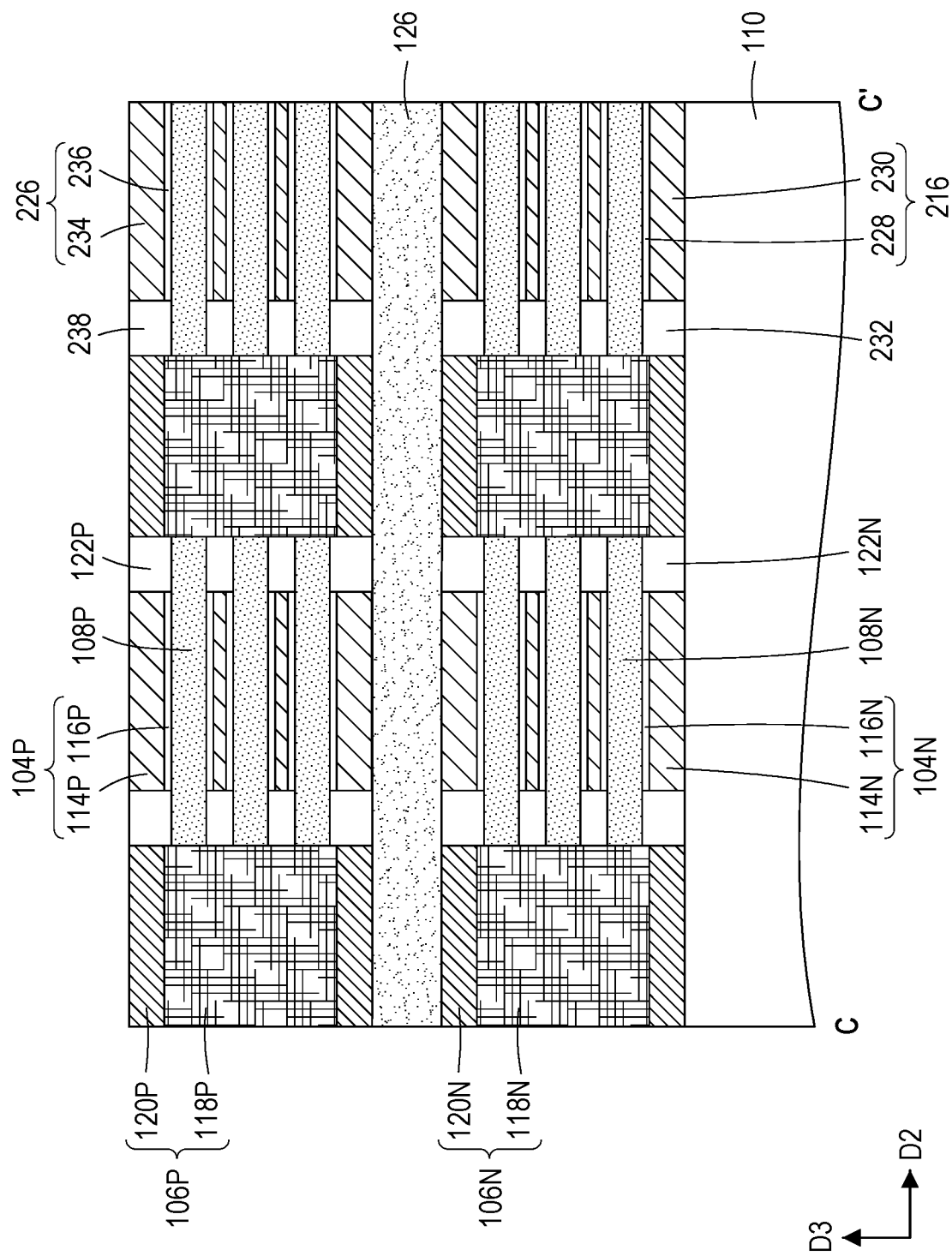
FIG. 2C is a schematic cross-sectional view along a C-C' line shown in FIG. 2B.
Figure 2D:
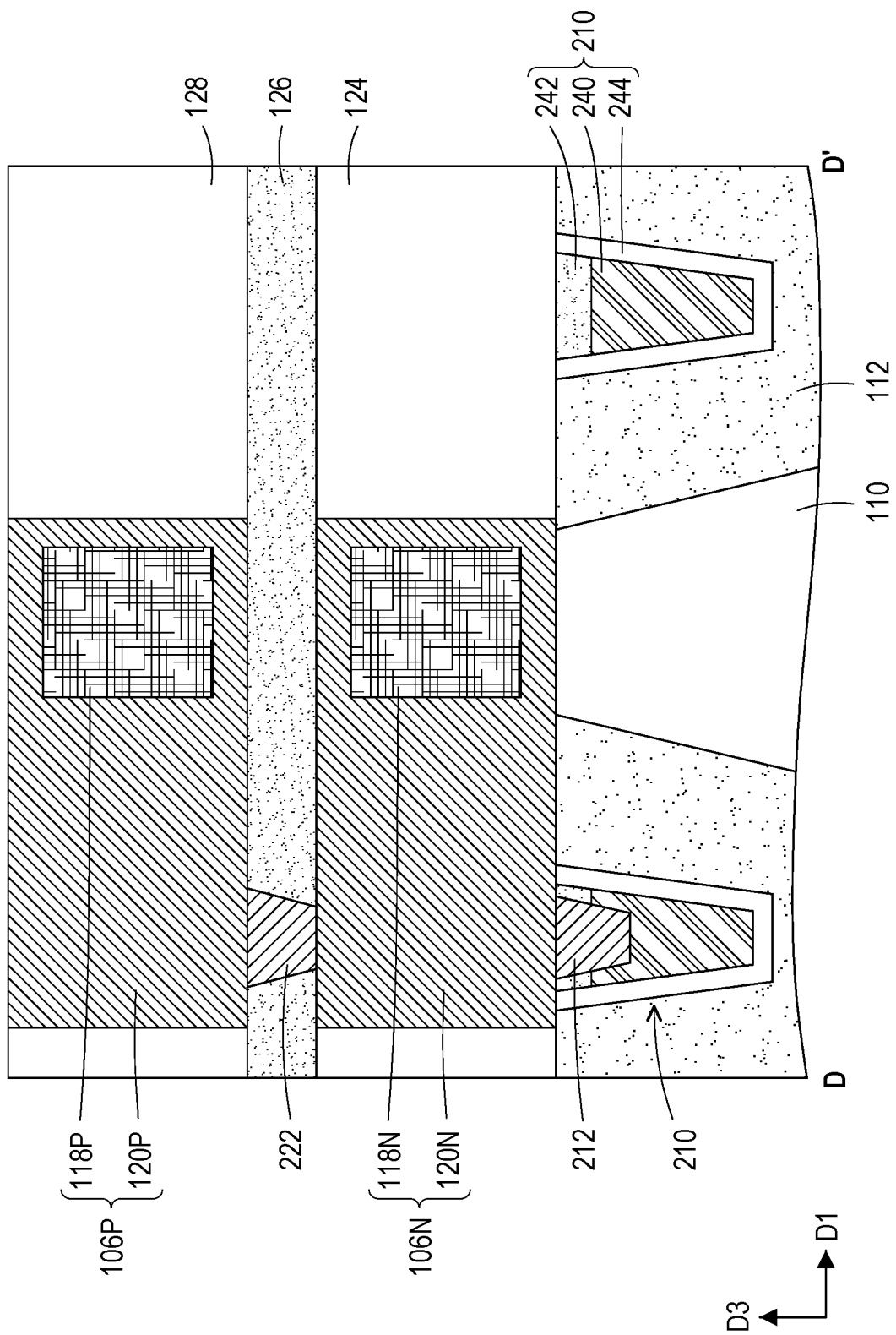
FIG. 2D is a schematic cross-sectional view along a D-D' line shown in FIG. 2B.

FIG. 2C is a schematic cross-sectional view along a C-C' line shown in FIG. 2B, and FIG. 2D is a schematic cross-sectional view along a D-D' line shown in FIG. 2B.

As shown in FIG. 2C, the spacer layer 126 separates the NFET 102N at the ground level from the PFET 102P at the elevated level. Conductive paths may be formed through the spacer layer 126, for routing the NFET 102N at the ground level to the PFET 102P at the elevated level or to further elevated levels where the word lines WLN, WLP and the bit lines BL are deployed. The conductive vias 208, 214, 222 described with reference to FIG. 2B may be portions of these conductive paths. Furthermore, the dummy gate structure 216 at the ground level is spaced apart from the dummy gate structure 226 at the elevated level by the spacer layer 126 as well.

As similar to each of the gate structures 104N, 104P, the dummy gate structure 216 may include a gate electrode 228 intersected with and penetrated through by the channel structures 108N, and include gate dielectric layers 230 separating the channel structures 108N from the gate electrode 228. Although not shown, work function layer(s) and barrier metal layer(s) may lie between the gate electrode 228 and the gate dielectric layers 230, and interfacial layers may respectively extend between one of the channel structures 108N and the covering gate dielectric layer 230. Moreover, as similar to the sidewall spacer 122N covering opposite sidewalls of the gate structure 104N, a sidewall spacer 232 may extend along opposite sidewalls of the dummy gate structure 216 (only a single sidewall is shown). The source/drain contact 106N between the gate structure 104N and the dummy gate structure 216 may be separated from the dummy gate structure 216 via the sidewall spacer 232, and portions of the channel structures 108N extending between this source/drain contact 106N and the dummy gate structure 216 may be wrapped around by the sidewall spacer 232.

Similarly, the dummy gate structure 226 over the spacer layer 126 may include a gate electrode 234 intersected with and penetrated through by the channel structures 108P, and include gate dielectric layers 236 separating the channel structures 108P from the gate electrode 234. Although not shown, work function layer(s) and barrier metal layer(s) may lie between the gate electrode 234 and the gate dielectric layers 236, and interfacial layers may respectively extend between one of the channel structures 108P and the covering gate dielectric layer 236. Moreover, a sidewall spacer 238 may extend along opposite sidewalls of the dummy gate structure 226 (only a single sidewall is shown). The source/drain contact 106P between the gate structure 104P and the dummy gate structure 226 may be separated from the dummy gate structure 226 via the sidewall spacer 238, and portions of the channel structures 108P extending between this source/drain contact 106P and the dummy gate structure 226 may be wrapped around by the sidewall spacer 238.

Although not shown in the cross-sectional view of FIG. 2C, the storage device 204 formed on the source/drain contact 106P between the gate structure 104P and the dummy gate structure 226 at a further elevated level may be a stacking structure including a pair of electrodes and a functional layer lying between the electrodes. According to the storage mechanism of the storage device 204, the functional layer may be a high-k dielectric layer, a crystalline layer, a multilayer structure including magnetic layers and an insulating layer in between, or a ferroelectric layer. The present disclosure is not limited to detailed structure of the storage device 204.

As indicated in FIG. 2D, the NFET 102N at the ground level is embedded in the dielectric layer 124 lying below the spacer layer 126, while the PFET 102P at the elevated level is embedded in the dielectric layer 128 formed on the spacer layer 126. In addition, the buried power rails 210 are embedded in the isolation structure 112 formed into the semiconductor substrate 110, and run along opposite sides of a portion of the semiconductor substrate 110 as a base region on which the channel structures 108N, 108P (which break at the epitaxial structures 118N, 118P) are stacked. In some embodiments, each of the buried power rails 210 includes a buried conductive line 240, an insulating capping layer 242 extending along a top surface of the buried conductive line 240 and an insulating liner 244 separating the conductive line 240 and the insulating capping layer 242 from the surrounding isolation structure 112. The contact structure 120N of one of the source/drain contacts 106N further extends to overlap one of the buried power rails 210, and is connected to the buried conductive line 240 of this buried power rail 210 through the conductive via 212 penetrating the insulating capping layer 242 of this buried power rail 210. In addition, the contact structure 120P of one of the source/drain contacts 106P at the elevated level further extends to overlap this source/drain contact 106N and the buried power rail 210 below, and is connected to the contact structure 120N of this source/drain contact 106N through the conductive via 222 penetrating the spacer layer 126.

As shown in FIG. 2B, the gate structure 104N at the ground level may intersect and overlap the buried power rails 210. The insulating capping layers 242 of the buried power rails 220 may provide electrical isolation between the buried conductive lines 240 and the gate structure 104N. Furthermore, although not shown, the buried conductive lines 240 in the buried power rails 210 may be routed to a back side of the semiconductor substrate 110. Backside through substrate vias (TSVs) extending to the buried conductive lines 240 from a back surface of the semiconductor substrate 110 and backside routings spreading on the back surface of the semiconductor substrate 110 may be provided for the back-side routing of the buried power rails 210.

Also not shown, an interconnection structure may be further formed on the PFET 102P. The storage devices 204 of the memory cells 202 and multiple metallization tiers including the word lines WLN, WLP and the bit lines BL may be embedded in the interconnection structure. As a possible configuration, the word lines WLN, WLP may be formed in one of the metallization tiers over the storage device 204, and the bit line BL intersected with the word lines WLN, WLP may be formed in another one of the metallization tiers over the storage device 204.

Figure 3A:
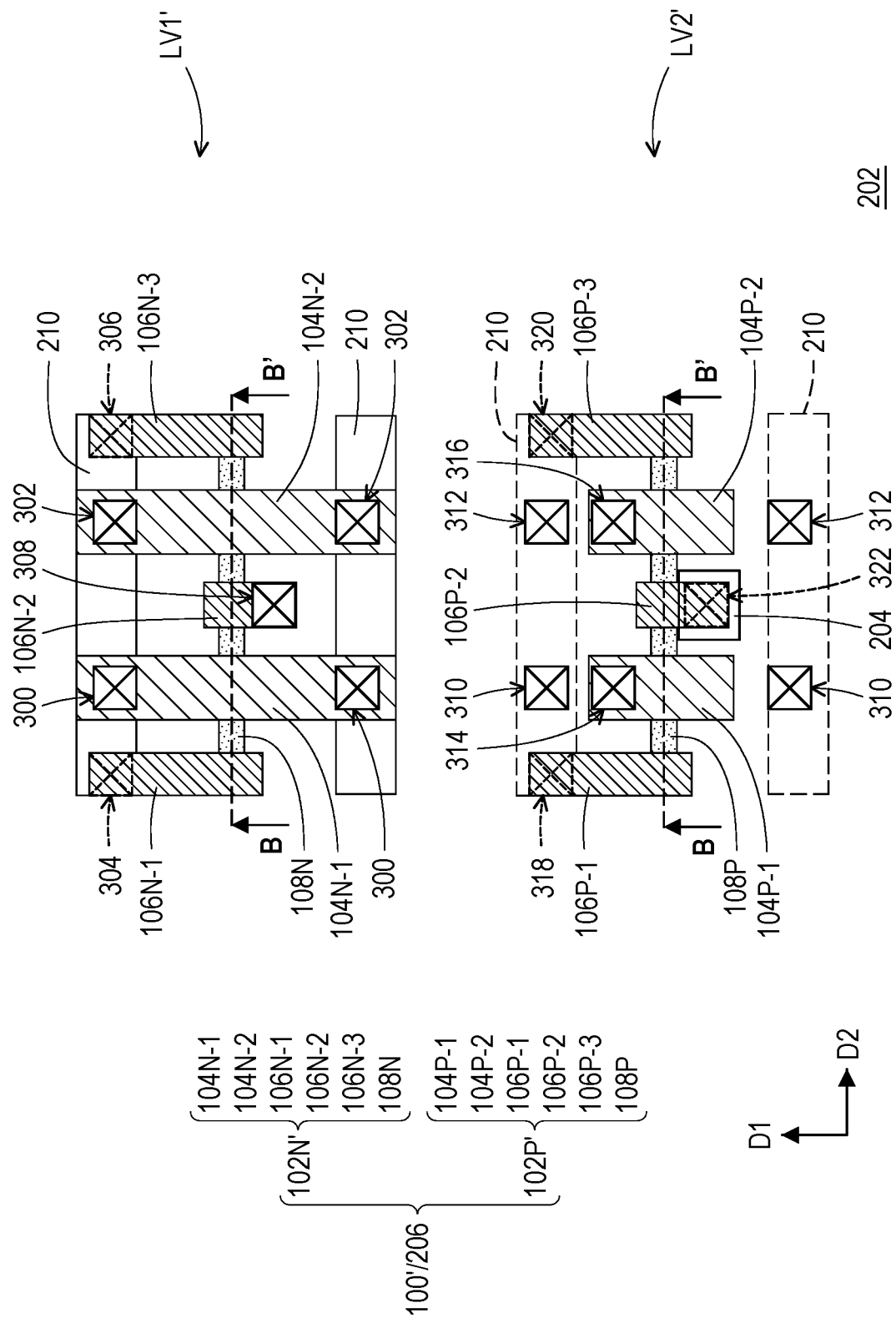
FIG. 3A illustrates another layout design of a memory cell in the non-volatile memory array shown in FIG. 2A, according to some embodiments of the present disclosure.

FIG. 3A illustrates another layout design of one of the memory cells 202 in the non-volatile memory array 200 shown in FIG. 2A, according to some embodiments of the present disclosure. This layout is similar to the layout described with reference to FIG. 2B. Differences therebetween will be described in details, while the same or the like parts may not be all repeated again.

As shown in FIG. 3A, the layout includes a first sub-layout LV1' at a ground level and a second sub-layout LV2' at an elevated level. In order to be illustrated individually, the first and second sub-layouts LV1', LV2' are depicted as being laterally offset from each other. However, the first sub-layout LV1' should actually lie below the second sub-layout LV2'.

A CFET 100' similar to the CFET 100 described with reference to FIG. 1A through FIG. 1C is provided as the access transistor 206 of the memory cell 202. An NFET 102N' in the CFET 100' is laid in the first sub-layout LV1' at the ground level. The NFET 102N' includes two gate structures 104N-1, 104N-2, and includes three source/drain contacts 106N-1, 106N-2, 106N-3. The gate structures 104N-1, 104N-2 are collectively functioned as a gate terminal of the NFET 102N'. Channel structures 108N of the NFET 102N' (which include vertically separated semiconductor sheets but are depicted as a single element in FIG. 3A) laterally penetrate through the gate structures 104N-1, 104N-2, and the source/drain contacts 106N-1, 106N-2, 106N-3 are disposed at breaks of the channel structures 108N in between the gate structures 104N-1, 104N-2 and at opposite sides of the gate structures 104N-1, 104N-2. The source/drain contacts 106N-1, 106N-3 at opposite sides of the gate structures 104N-1, 104N-2 may be collectively functioned as one of source and drain terminals of the NFET 102N', whereas the source/drain contact 106N-2 between the gate structures 104N-1, 104N-2 may be functioned as the other one of the source and drain terminals of the NFET 102N'. According to some embodiments, the gate structures 104N-1, 104N-2 extend along the first lateral direction D1, while the channel structures 108N extend along the second lateral direction D2. In these embodiments, the source/drain contacts 106N-1, 106N-2, 106N-3 are separately disposed along the second lateral direction D2. The gate structure 104N-1 extends between the source/drain contacts 106N-1, 106N-2, and the gate structure 104N-2 extends between the source/drain contacts 106N-2, 106N-3.

As collectively functioned as the gate terminal of the NFET 102N', the gate structures 104N-1, 104N-2 are connected to the same word line WLN described with reference to FIG. 2A. Conductive vias 300 may be separately disposed on the gate structure 104N-1, for connecting the gate structure 104N-1 to this word line WLN. Similarly, conductive vias 302 may be separately disposed on the gate structure 104N-2, for connecting the gate structure 104N-2 to the same word line WLN.

On the other hand, as collectively functioned as one of the source and drain terminals of the NFET 102N', the source/drain contacts 106N-1, 106N-3 at opposite sides of the gate structures 104N-1, 104N-2 are both connected to the overlapped buried power rail 210 extending along a first side of the channel structures 108N. To be more specific, the source/drain contacts 106N-1, 106N-3 are connected to the buried conductive line 240 (described with reference to FIG. 2D) of this buried power rail 210. A conductive via 304 penetrating through the insulating capping layer 242 of this buried power rail 210 (also shown in FIG. 2D) may be used for establishing electrical connection between the source/drain contact 106N-1 and the buried conductive line 240 of this buried power rail 210. Similarly, a conductive via 306 penetrating through the insulating capping layer 242 of this buried power rail 210 may be used for establishing electrical connection between the source/drain contact 106N-3 and the buried conductive line 240 of this buried power rail 210. According to some embodiments, the other buried power rail 210 extends along a second side of the channel structures 108N, and are coupled to an adjacent memory cell 202.

Further, the source/drain contact 106N-2 functioned as the other one of the source and drain terminal of the NFET 102N' is connected to the storage device 204 through a source/drain contact of the PFET 102P' (i.e., the source/drain contact 106P-2 to be described) at the elevated level. A conductive via 308 standing on the source/drain contact 106N-2 may be used for routing the source/drain contact 106N-2. As not being connected to the buried power rails 210, the source/drain contact 106N-2 may not further extend to overlap any of the buried power rails 210. Instead, the source/drain contact 106N-2 may extend between the buried power rails 210.

Since the NFET 102N' has multiple gate structures and more than three source/drain contacts, the NFET 102N' has a rather high pattern density. Further, in some embodiments as shown in FIG. 3A, the NFET 102N' is symmetrical with respect to a virtual axis extending through the source/drain contact 106N-2. Due to the high pattern density and symmetry of the NFET 102N', a dummy gate structure similar to the dummy gate structure 216 described with reference to FIG. 2B may not be used in the NFET 102N'.

As similar to the NFET 102N' at the ground level, a PFET 102P' in the CFET 100' at the elevated level includes two gate structures 104P-1, 104P-2, and includes three source/drain contacts 106P-1, 106P-2, 106P-3. The gate structures 104P-1, 104P-2 are collectively functioned as a gate terminal of the PFET 102P'. Channel structures 108P of the PFET 102P' (which include vertically separated semiconductor sheets but are depicted as a single element in FIG. 3A) laterally penetrate through the gate structures 104P-1, 104P-2, and the source/drain contacts 106P-1, 106P-2, 106P-3 are disposed at breaks of the channel structures 108P in between the gate structures 104P-1, 104P-2 and at opposite sides of the gate structures 104P-1, 104P-2. The source/drain contacts 106P-1, 106P-3 at opposite sides of the gate structures 104P-1, 104P-2 may be collectively functioned as one of source and drain terminals of the PFET 102P', whereas the source/drain contact 106P-2 between the gate structures 104P-1, 104P-2 may be functioned as the other one of the source and drain terminals of the PFET 102P'. In those embodiments where the ground level gate structures 104N-1, 104N-2 extend along the first lateral direction D1 and the ground level channel structures 108N extend along the second lateral direction D2, the gate structures 104P-1, 104P-2 at the elevated level may overlap the ground level gate structures 104N-1, 104N-2 and also extend along the first lateral direction D1, while the channel structures 108P at the elevated level may overlap the ground level channel structures 108N and extend along the second lateral direction D2 as well. Further, the source/drain contacts 106P-1, 106P-2, 106P-3 at the elevated level overlap the source/drain contacts 106N-1, 106N-2, 106N-3 respectively, and are separately arranged along the second lateral direction D2. The gate structure 104P-1 extends between the source/drain contacts 106P-1, 106P-2, and the gate structure 104P-2 extends between the source/drain contacts 106N-2, 106N-3.

In some embodiments, the gate structures 104P-1, 104P-2 are confined within the memory cell 202, rather than being shared with adjacent memory cells 202. In these embodiments, the gate structure 104P-1 may extend between conductive vias 310 connected to the conductive vias 300 standing on the gate structure 104N-1 at the ground level. Similarly, the gate structure 104P-2 may extend between conductive vias 312 connected to the conductive vias 302 standing on the gate structure 104N-2 at the ground level. The gate structure 104N-1 at the ground level may be routed to an overlying word line WLN (not shown) through the conductive vias 300, 310, and the gate structure 104N-2 at the ground level may be routed to the same word line WLN through the conductive vias 302, 312. On the other hand, the gate structure 104P-1 at the elevated level may be connected to an overlying word line WLP (not shown) through a conductive via 314 standing thereon, and the gate structure 104P-2 at the elevated level may be connected to the same word line WLP through a conductive via 316 standing thereon.

The source/drain contacts 106P-1, 106P-3 may be connected to the source/drain contacts 106N-1, 106N-3 of the NFET 102N' at the ground level through conductive vias 318, 320, respectively. In addition, the connected source/drain contacts 106P-1, 106N-1 as well as the connected source/drain contacts 106P-3, 106N-3 may be further connected to the overlapped buried power rail 210 through the conductive vias 304, 306, respectively. On the other hand, the source/drain contact 106P-2 may be connected to the source/drain contact 106N-2 at the ground level through the conductive via 308 standing on the source/drain contact 106N-2, and may be further connected to the storage device 204 formed at a further elevated level through a conductive via 322. Although not shown, the other terminal of the storage device 204 is connected to an overlying bit line BL.

As similar to the NFET 102N' at the ground level, the PFET 102P' has multiple gate structures and more than three source/drain contacts, thus has a rather high pattern density as well. Further, in some embodiments as shown in FIG. 3A, the PFET 102P' is symmetrical with respect to a virtual axis extending through the source/drain contact 106P-2. Due to the high pattern density and symmetry of the PFET 102P', a dummy gate structure similar to the dummy gate structure 226 described with reference to FIG. 2B may not be used in the PFET 102P'.

Figure 3B:
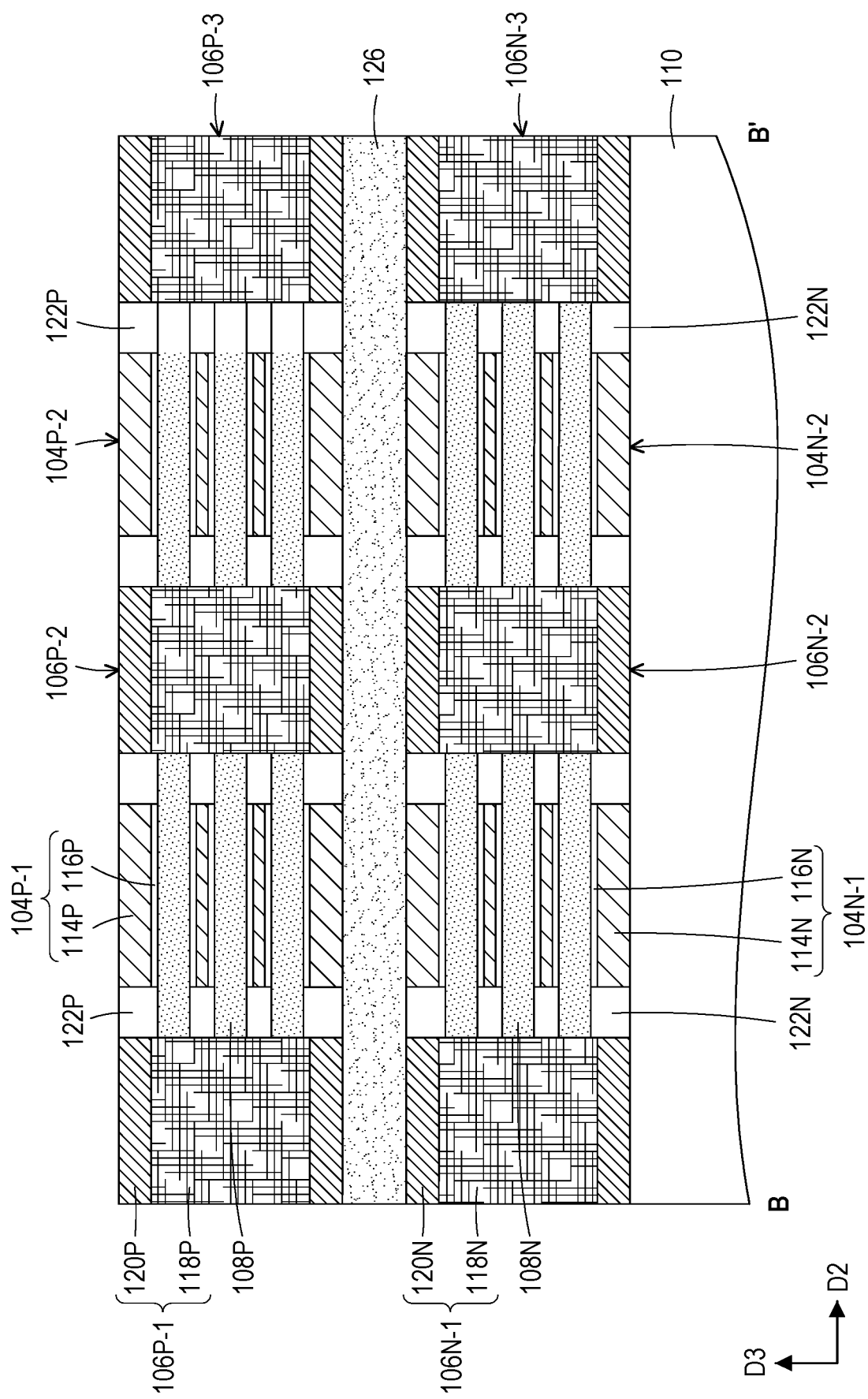
FIG. 3B is a schematic cross-sectional view along a B-B' line shown in FIG. 3A.

FIG. 3B is a schematic cross-sectional view along a B-B' line shown in FIG. 3A.

As shown in FIG. 3B, the gate structures 104N-1, 104N-2 of the NFET 102N' at the ground level are each structurally similar to the gate structure 104N described with reference to FIG. 1B, FIG. 1C and FIG. 2C. The gate electrode 114N of each of the gate structures 104N-1, 104N-2 are intersected with and penetrated through by the channel structures 108N, and the gate dielectric layers 116N of each of the gate structures 104N-1, 104N-2 separate the channel structures 108N from the gate electrode 114N. Although not shown, work function layer(s) and barrier metal layer(s) may lie between the gate electrode 114N and the gate dielectric layers 116N in each of the gate structures 104N-1, 104N-2, and interfacial layers may respectively extend between one of the channel structures 108N and the covering gate dielectric layer 116N. Furthermore, opposite sidewalls of each of the gate structures 104N-1, 104N-2 may be covered by the sidewall spacer 122N, and portions of the channel structures 108N extending between the gate structures 104N-1, 104N-2 and the source/drain contacts 106N-1, 106N-2, 106N-3 may be wrapped around by the sidewall spacers 122N.

Also, the source/drain contacts 106N-1, 106N-2, 106N-3 are each structurally similar to the source/drain contact 106N described with reference to FIG. 1C and FIG. 2C and FIG. 2D. The epitaxial structure 118N of each of the source/drain contacts 106N-1, 106N-2, 106N-3 is grown from the channel structures 108N, and is covered by the contact structure 120N in the same source/drain contact 106N-1/106N-2/106N-3.

Although not shown, the NFET 102N' at the ground level is embedded in the dielectric layer 124 as described with reference to FIG. 1B and FIG. 2D. The spacer layer 126 may cover the NFET 102N' as well as the dielectric layer 124, and separate the NFET 102N' from the PFET 102P' at the elevated level. Conductive paths may be formed through the spacer layer 126, for routing the NFET 102N' at the ground level to the PFET 102P' at the elevated level or to further elevated levels where the word lines WLN, WLP, the bit lines BL and the storage device 204 are deployed. The conductive vias 300, 302, 308, 318, 320 described with reference to FIG. 3A may be portions of these conductive paths.

The gate structures 104P-1, 104P-2 of the PFET 102P' at the elevated level are each structurally similar to the gate structure 104P described with reference to FIG. 1B, FIG. 1C and FIG. 2C. The gate electrode 114P of each of the gate structures 104P-1, 104P-2 are intersected with and penetrated through by the channel structures 108P, and the gate dielectric layers 116P of each of the gate structures 104P-1, 104P-2 separate the channel structures 108P from the gate electrode 114P. Although not shown, work function layer(s) and barrier metal layer(s) may lie between the gate electrode 114P and the gate dielectric layers 116P in each of the gate structures 104P-1, 104P-2, and interfacial layers may respectively extend between one of the channel structures 108P and the covering gate dielectric layer 116P. Furthermore, opposite sidewalls of each of the gate structures 104P-1, 104P-2 may be covered by the sidewall spacer 122P, and portions of the channel structures 108P extending between the gate structures 104P-1, 104P-2 and the source/drain contacts 106P-1, 106P-2, 106P-3 may be wrapped around by the sidewall spacers 122P.

Also, the source/drain contacts 106P-1, 106P-2, 106P-3 are each structurally similar to the source/drain contact 106P described with reference to FIG. 1C and FIG. 2C and FIG. 2D. The epitaxial structure 118P of each of the source/drain contacts 106P-1, 106P-2, 106P-3 is grown from the channel structures 108P, and is covered by the contact structure 120P in the same source/drain contact 106P-1/106P-2/106P-3.

Although not shown, the PFET 102P' is embedded in the dielectric layer 128 described with reference to FIG. 2D. Also not shown, an interconnection structure may be further formed on the PFET 102P'. The storage devices 204 of the memory cells 202 and multiple metallization tiers including the word lines WLN, WLP and the bit lines BL may be embedded in the interconnection structure. As a possible configuration, the word lines WLN, WLP may be formed in one of the metallization tiers over the storage device 204, and the bit line BL intersected with the word lines WLN, WLP may be formed in another one of the metallization tiers over the storage device 204.

According to some embodiments, the non-volatile memory array 200 with any of the different layouts described above is formed in a standalone memory chip that is dedicated solely to memory functions. In other embodiments, the non-volatile memory array 200 can be embedded in a semiconductor die, along with circuits with various logic functions and memory arrays of other types.

Figure 4:
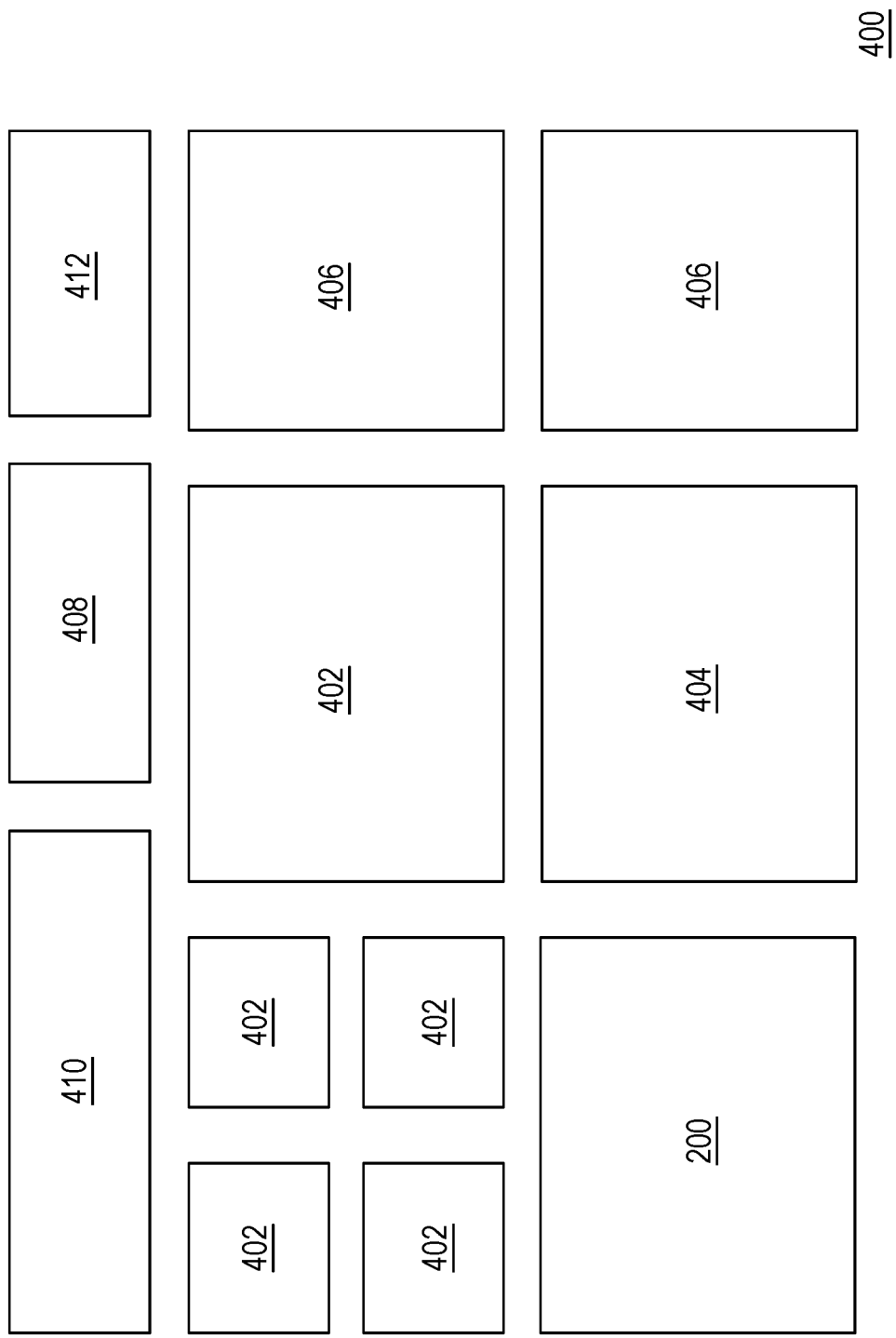
FIG. 4 is a schematic plan view illustrating a floor plan of a semiconductor die, according to some embodiments of the present disclosure.

FIG. 4 is a schematic plan view illustrating a floor plan of a semiconductor die 400, according to some embodiments of the present disclosure.

The semiconductor die 400 may be a system-on-a-chip (SoC) die that integrates various integrated circuits on a single platform. In addition to the non-volatile memory array 200 described above, the semiconductor die 400 may include central processing unit (CPU) cores 402, a multi-core graphic processing unit (GPU) 404 and cache memories 406 for the CPU cores 402 and the multi-core GPU 404. In some embodiments, the semiconductor die 400 further includes at least one input/output circuit 408, a memory controller circuit 410 and a power management circuit 412. These circuit blocks can be arranged in any configuration, rather than being limited to the specific arrangement shown in FIG. 4.

A static random access memory (SRAM) may be provided as each of the cache memories 406, and pairs of NFET and PFET in each memory cell of the SRAM may be respectively provided by the CFETs 100 as described with reference to FIG. 1A through FIG. 1C.

Figure 5A:
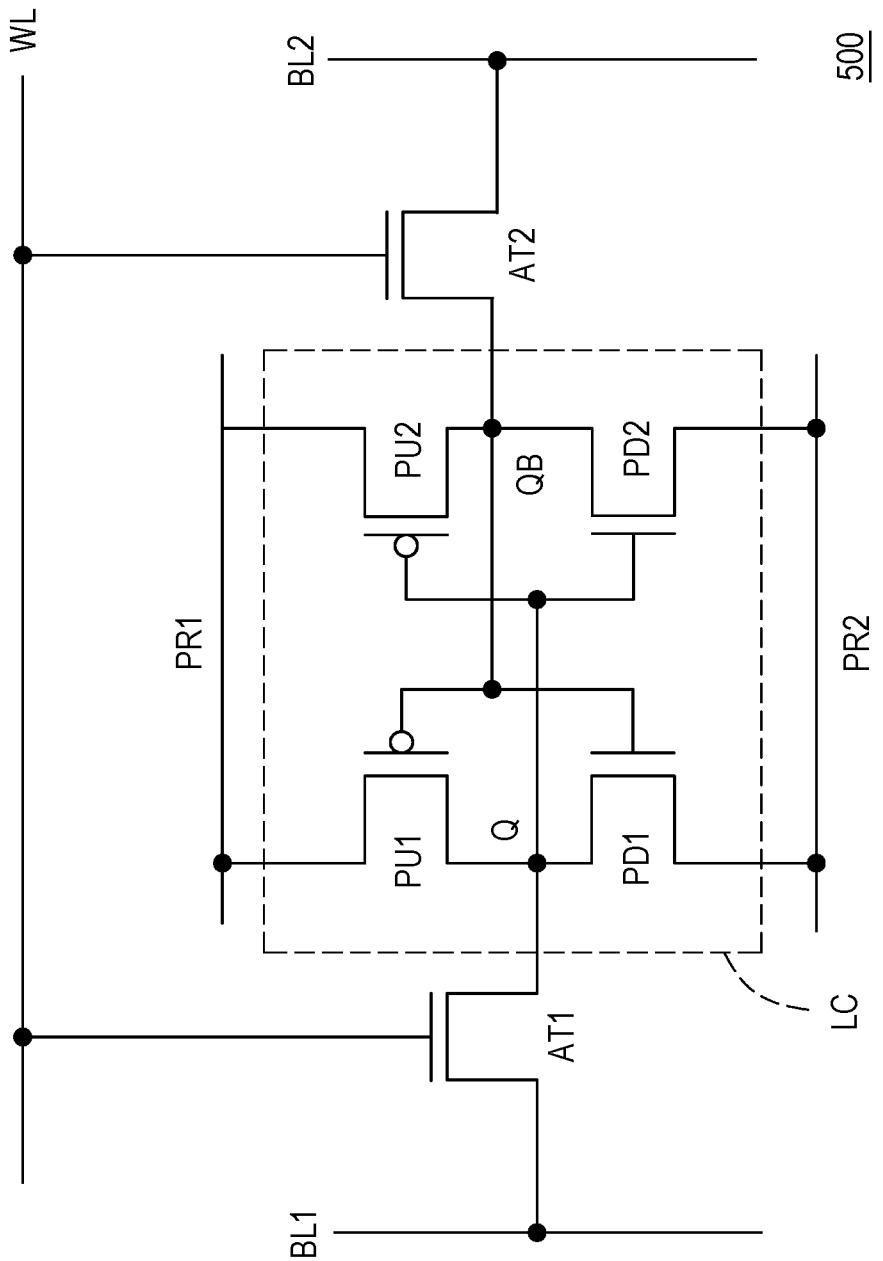
FIG. 5A is a circuit diagram of a SRAM cell in a cache memories of the semiconductor die, according to some embodiments of the present disclosure.

FIG. 5A is a circuit diagram of a SRAM cell 500 in one of the cache memories 406, according to some embodiments of the present disclosure.

Referring to FIG. 5A, the SRAM cell 500 may include a latch circuit LC formed by a first inverter and a second inverter cross-coupled with the first inverter. The first inverter includes a pull down transistor PD1 and a pull up transistor PU1 connected with the pull down transistor PD1 by a common source/drain terminal and a common gate terminal. Similarly, the second inverter includes a pull down transistor PD2 and a pull up transistor PU2 connected with the pull down transistor PD2 by a common source/drain terminal and a common gate terminal. The pull down transistors PD1, PD2 are each provided by an NFET, while the pull up transistor PU1, PU2 are each provided by a PFET. The common source/drain terminal of the first inverter is connected to the common gate terminal of the second inverter. On the other hand, the common source/drain terminal of the second inverter is connected to the common gate terminal of the first inverter. Further, the unshared source/drain terminal of the pull up transistor PU1 in the first inverter and the unshared source/drain terminal of the pull up transistor PU2 in the second inverter are connected to a power rail PR1 configured to receive a power supply voltage. In addition, the unshared source/drain terminal of the pull down transistor PD1 in the first inverter and the unshared source/drain terminal of the pull down transistor PD2 in the second inverter are connected to a power rail PR2 configured to receive a reference voltage, such as a ground voltage.

The common source/drain terminal of the first inverter is referred to as a first storage node Q, and the common source/drain terminal of the second inverter is referred to as a second storage node QB. When the storage node Q stores a logic high voltage (i.e., a logic state "1"), the common gate terminal of the second inverter is also charged to the logic high voltage, and pull down transistor PD2 of the second inverter is turned on, while the pull up transistor PU1 of the second inverter is kept in an off state. Consequently, the storage node QB is pulled down by the power rail PR2 connected to the unshared source/drain terminal of the pull down transistor PD2, and stores a logic low voltage (i.e., a logic state "0"). On the other hand, when the storage node Q stores the logic low voltage, the storage node QB stores the logic high voltage. Therefore, the storage nodes Q, QB can hold complementary data, as long as the power supply voltage and the reference voltage remain coupled to the latch circuit LC via the power rails PR1, PR2.

Moreover, an access transistor AT1 is connected to the storage node Q, for controlling access of the storage node Q. The access transistor AT1 may be provided by an NFET, with a gate terminal connected to a word line WL; a source/drain terminal connected to the storage node Q; and the other source/drain terminal connected to a bit line BL1. When the word line WL is asserted, the access transistor AT1 is turned on, and the storage node Q can be written or sensed through the bit line BL1. Otherwise, the storage node Q is decoupled from the bit line BL1.

Similarly, an access transistor AT2 is connected to the storage node QB, for controlling access of the storage node QB. The access transistor 122 may also be provided by an NFET, with a gate terminal connected to the word line WL; a source/drain terminal connected to the storage node QB; and the other source/drain terminal connected to a bit line BL2. When the word line WL is asserted, the access transistor 120 is turned on as well, and the storage node QB can be written or sensed through the bit line BL2. Otherwise, the storage node QB is decoupled from the bit line BL2.

As will be described in greater details, the CFET 100 described with reference to FIG. 1A through FIG. 1C is provided as each of the first second inverters, for cell size reduction. Further, in order to release crowded overhead routing area, the power rails PR1, PR2 may be provided by buried power rails each similar to the buried power rail 210 described with reference to FIG. 2B, FIG. 2D and FIG. 3A.

Figure 5B:
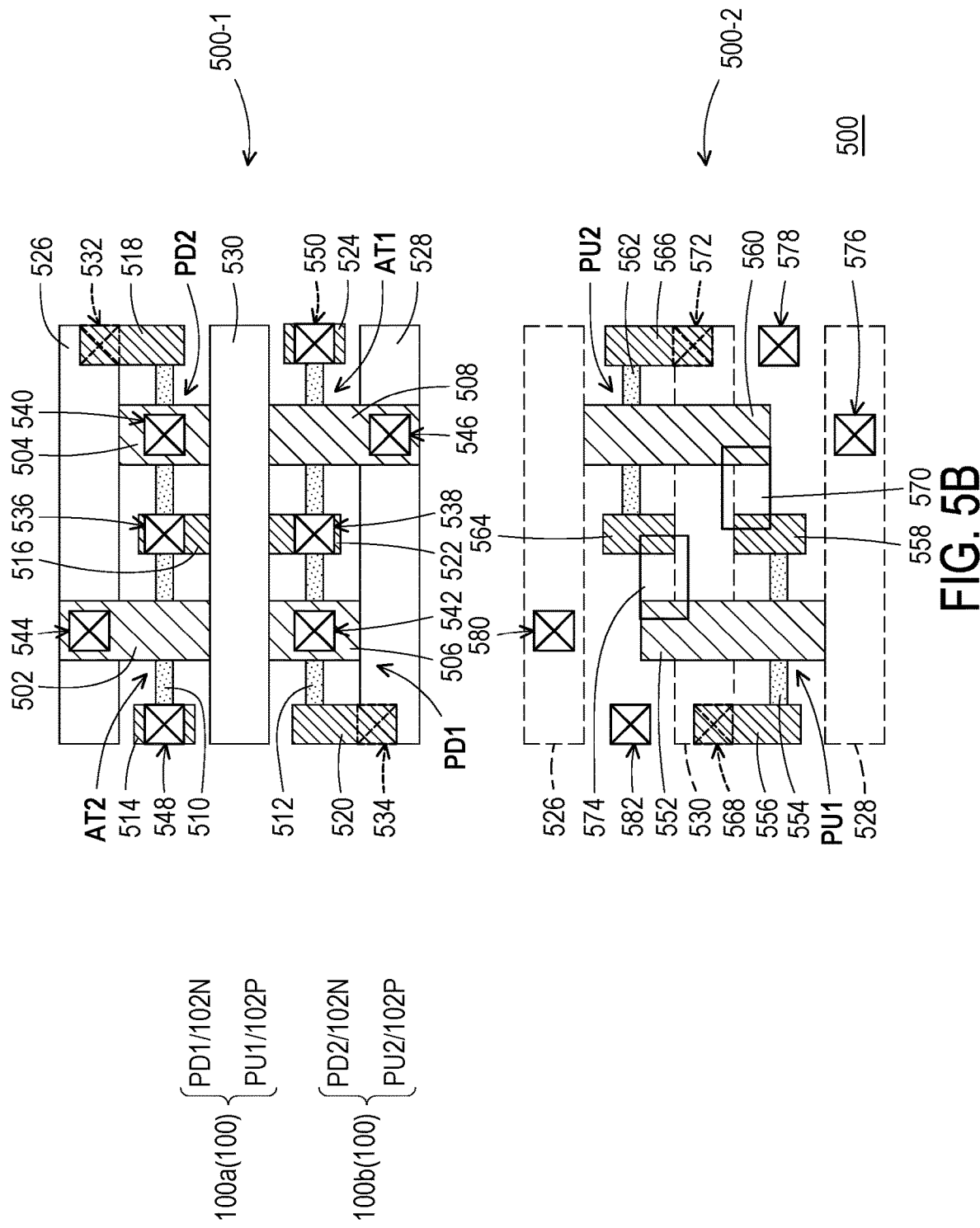
FIG. 5B illustrates a layout design of the SRAM cell as shown in FIG. 5A, according to some embodiments of the present disclosure.

FIG. 5B illustrates a layout design of the SRAM cell 500 as shown in FIG. 5A, according to some embodiments of the present disclosure.

The SRAM cell 500 is formed as a multi-story structure. A first portion of the SRAM cell 500 at a ground level is arranged according to a first sub-layout 500-1, and a second portion of the SRAM cell 500 at an elevated level is arranged according to a second sub-layout 500-2. In order to be illustrated individually, the first and second sub-layouts 500-1, 500-2 are depicted as being laterally offset from each other. However, the first sub-layout 500-1 should actually lie below the second sub-layout 500-2.

The pull down transistors PD1, PD2 and the access transistors AT1, AT2 provided by NFETs are laid in the first sub-layout 500-1 at the ground level. According to the first sub-layout 500-1, gate structures 502, 504, 506, 508 separately extend along the first lateral direction D1, while channel structures 510, 512 separately extend along the second lateral direction D2. The channel structure 510 intersects with and penetrates through the gate structures 502, 504 spaced apart from each other along the second lateral direction D2. In addition, the channel structure 512 substantially parallel to the channel structure 510 intersects with and penetrates through the gate structures 506, 508 substantially aligned with the gate structures 502, 504, respectively. Moreover, source/drain contacts 514, 516, 518 are disposed in between and at opposite sides of the gate structures 502, 504, and are located at breaks of the channel structure 510. In addition, source/drain contacts 520, 522, 524 are disposed in between and at opposite sides of the gates structures 506, 508, and are located at breaks of the channel structure 512.

The access transistor AT2 is defined at an intersection of the gate structure 502 and the channel structure 510, and the pull down transistor PD2 is defined at an intersection of the gate structure 504 and the channel structure 510. The source/drain contact 516 between the gate structures 502, 504 is functioned as the common source/drain terminal of the access transistor AT2 and the pull down transistor PD2. In addition, the source/drain contact 514 at another side of the gate structure 502 is functioned as the other source/drain terminal of the access transistor AT2, and the source/drain contact 518 at another side of the gate structure 504 is functioned as the other source/drain terminal of the pull down transistor PD2.

Further, the pull down transistor PD1 is defined at an intersection of the gate structure 506 and the channel structure 512, while the access transistor AT1 is defined at an intersection of the gate structure 508 and the channel structure 512. The source/drain contact 522 between the gate structures 506, 508 is functioned as the common source/drain terminal of the pull down transistor PD1 and the access transistor AT1. In addition, the source/drain contact 520 at another side of the gate structure 508 is functioned as the other source/drain terminal of the pull down transistor PD1, and the source/drain contact 524 at another side of the gate structure 508 is functioned as the other source/drain terminal of the access transistor AT2.

Among the NFETs at the ground level, the pull down transistors PD1, PD2 are overlapped by the pull up transistors PU1, PU2 at the elevated level. The pull down transistor PD1 and the pull up transistor PU1 stacked thereon are embodied by a first one of the CFET 100 (also referred to as a CFET 100*a*) described with reference to FIG. 1A through FIG. 1C, whereas the pull down transistor PD2 and the pull up transistor PU2 stacked thereon are embodied by a second one of the CFET 100 (also referred to as a CFET 100*b*). That is, the pull down transistors PD1, PD2 are respectively the NFET 102N in each of the CFETs 100*a*, 100*b*. Accordingly, the gate structures 504, 506 of the pull down transistors PD1, PD2 are each structurally identical with the gate structure 104N described with reference to FIG. 1B and FIG. 1C, and the channel structures 510, 512 extending through the gate structures 504, 506 respectively include the channel structures 108N described with reference to FIG. 1B and FIG. 1C. Also, the source/drain contacts 520, 522, 516, 518 as the source/drain terminals of the pull down transistors PD1, PD2 are each structurally identical with the source/drain contact 106N described with reference to FIG. 1C. Although not shown, the gate structure 504 and the adjacent source/drain contacts 520, 522 of the pull down transistor PD1 may be separated by a sidewall spacer as similar to the sidewall spacer 122N described with reference to FIG. 1C and FIG. 2C. Similarly, the gate structure 506 and the source/drain contacts 516, 518 of the pull down transistor PD2 may be separated by a sidewall spacer as well.

Although not being included in the first and second CFETs 100a, 100b, the access transistors AT1, AT2 sharing the channel structures 510, 512 and the common source/drain contacts 516, 522 with the pull down transistors PD1, PD2 are structurally identical with the NFETs 102N of the first and second CFETs 100a, 100b as well. That is, the gate structures 502, 508 of the access transistors AT1, AT2 are each structurally identical with the gate structure 104N, and the source/drain contacts 514, 524 are each structurally identical with the source/drain contact 106N. Further, the access transistor AT1 may also include a sidewall spacer (not shown) separating the gate structure 508 from the source/drain contacts 522, 524. Similarly, the access transistor AT2 may also include a sidewall spacer (not shown) separating the gate structure 502 from the source/drain contacts 514, 516.

In some embodiments, buried power rails 526, 528, 530 are embedded in an isolation structure (not shown) formed into a semiconductor substrate (also not shown) lying below the pull down transistors PD1, PD2 and the access transistors AT1, AT2. The buried power rails 526, 528 are collectively functioned as the power rail PR2 configured to receive the reference voltage (e.g., the ground voltage), while the buried power rail 530 may be functioned as the power rail PR1 configured to receive the power supply voltage. The channel structure 510 may extend in between and is substantially parallel with the buried power rails 526, 530, and the channel structure 512 may extend in between and is substantially parallel with the buried power rails 528, 530. In terms of detailed structures, the buried power rails 526, 528, 530 are each similar to the buried power rail 210 described with reference to FIG. 2B and FIG. 2D. A conductive via 532 may extend through an insulating capping layer of the buried power rail 526, and connect the source/drain contact 518 of the pull down transistor PD2 to a buried conductive line of the buried power rail 526. Similarly, a conductive via 534 may extend through an insulating capping layer of the buried power rail 528, and connect the source/drain contact 520 of the pull down transistor PD1 to a buried conductive line of the buried power rail 528.

Further, more conductive vias are disposed for routing the pull down transistors PD1, PD2 and the access transistors AT2 to the elevated level or above. The other source/drain contact 516 of the pull down transistor PD2, which is shared with the access transistor AT2, may be connected to a source/drain contact of the pull up transistor PU2 at the elevated level through a conductive via 536. Similarly, the other source/drain contact 522 of the pull down transistor PD1, which is shared with the access transistor AT1, may be connected to a source/drain contact of the pull up transistor PU1 at the elevated level through a conductive via 538. In addition, the gate structure 504 of the pull down transistor PD2 may be connected to a gate structure of the overlying pull up transistor PU2 through a conductive via 540, and the gate structure 506 of the pull down transistor PD1 may be connected to a gate structure of the overlying pull up transistor PU1 through a conductive via 542. Also, the gate structure 502 of the access transistor AT2 may be connected to the word line WL running at a further elevated level (not shown in FIG. 5B) through a conductive via 544. Similarly, the gate structure 508 of the access transistor AT1 may be connected to this overlying word line WL through a conductive via 546. In addition, the other source/drain contact 514 not shared with the pull down transistor PD2 may be connected to the bit line BL2 running over the second sub-layout 500-2 (not shown in FIG. 5B) through a conductive via 548. Similarly, the other source/drain contact 524 of the access transistor AT1 not shared with the pull down transistor PD1 may be connected to the bit line BL1 running over the second sub-layout 500-2 (also not shown) through a conductive via 550.

To provide a planar base for the pull up transistors PU1, PU2 at the elevated level, the pull down transistors PD1, PD2 as well as the access transistors AT1, AT2 at the ground level may be embedded in a dielectric layer as similar to the dielectric layer 124 described with reference to FIG. 1B and FIG. 2D. Moreover, an insulating spacer layer as similar to the spacer layer 126 described with reference to FIG. 1B and FIG. 2D may cover the dielectric layer, to vertically space apart the pull down transistors PD1, PD2 and the access transistors AT1, AT2 at the ground level from the pull up transistors PU1, PU2 formed thereon. Conductive paths may be formed through the spacer layer, for routing the pull down transistors PD1, PD2 and the access transistors AT1, AT2 at the ground level to the pull up transistors PU1, PU2 at the elevated level or to further elevated levels where the word line WL and the bit lines BL1, BL2 are deployed. The conductive vias 536, 538, 540, 542, 544, 546, 548, 550 described with reference to FIG. 5B may be portions of these conductive paths.

The pull up transistors PU1, PU2 provided by PFETs are laid in the second sub-layout 500-2 at the elevated level. The pull up transistor PU1 includes a gate structure 552, a channel structure 554 laterally penetrating through the gate structure 552 and source/drain contacts 556, 558 at opposite sides of the gate structure 552 and in lateral contact with the channel structure 554. Similarly, the pull up transistor PU2 includes a gate structure 560, a channel structure 562 laterally penetrating through the gate structure 560 and source/drain contacts 564, 566 at opposite sides of the gate structure 552 and in lateral contact with the channel structures 562. As the pull down transistor PD1 at the ground level and the pull up transistor PU1 at the elevated level are embodied by the first CFET 100a, the pull up transistor PU1 is the PFET 102P of the first CFET 100a. Also, as the pull down transistor PD2 at the ground level and the pull up transistor PU2 at the elevated level are embodied by the second CFET 100b, the pull up transistor PU2 is the PFET 102P of the second CFET 100b. That is, the gate structures 552, 560 are each structurally identical with the gate structure 104P described with reference to FIG. 1A through FIG. 1C, and the channel structures 554, 562 extending through the gate structures 552, 560 respectively include the channel structures 108P described with reference to FIG. 1B and FIG. 1C. Also, the source/drain contacts 556, 558, 564, 566 as the source/drain terminals of the pull up transistors PU1, PU2 are each structurally identical with the source/drain contact 106P described with reference to FIG. 1C. Although not shown, the pull up transistor PU1 may also include a sidewall spacer separating the gate structure 552 from the source/drain contacts 556, 558. Similarly, the access transistor AT2 may also include a sidewall spacer (not shown) separating the gate structure 560 from the source/drain contacts 562, 564.

The source/drain contact 556 as one of source and drain terminals of the pull up transistor PU1 is connected to the buried power rail 530 coupled to the power supply voltage. A conductive via 568 extending below the source/drain contact 556 may be involved for establishing a conduction path between the source/drain contact 556 to the buried power rail 530. On the other hand, the source/drain contact 558 as the other one of the source and drain terminals of the pull up transistor PU1 is connected with the gate structure 560 of the pull up transistor PU2 and the source/drain contact 522 of the pull down transistor PD1, to form the storage node Q described with reference to FIG. 5A. As described, the conductive via 538 may be involved for establishing a conduction path between the source/drain contacts 558, 522. In addition, a butted contact 570 extending over the source/drain contact 558 and the gate structure 560 may be used for connecting the source/drain contact 558 to the gate structure 560.

Similarly, the source/drain contact 566 as one of source and drain terminals of the pull up transistor PU2 is connected to the buried power rail 530 coupled to the power supply voltage. A conductive via 572 extending below the source/drain contact 566 may be involved for establishing a conduction path between the source/drain contact 566 to the buried power rail 530. On the other hand, the source/drain contact 564 as the other one of the source and drain terminals of the pull up transistor PU2 is connected with the gate structure 552 of the pull up transistor PU1 and the source/drain contact 516 of the pull down transistor PD2, to form the storage node QB described with reference to FIG. 5A. As described, the conductive via 536 may be involved for establishing a conduction path between the source/drain contacts 564, 516. In addition, a butted contact 574 extending over the source/drain contact 564 and the gate structure 552 may be used for connecting the source/drain contact 564 to the gate structure 552.

Moreover, the second sub-layout 500-2 may further include conductive vias for routing the access transistors AT1, AT2 at the ground level to the word line WL and the bit lines BL1, BL2 at further elevated level(s). The gate structure 508 of the access transistor AT1 at the ground level may be connected to the overlying word line WL through the conductive via 546 standing on the gate structure 508 and a conductive via 576 laid in the second sub-layout 500-2. In addition, the source/drain contact 524 as the unshared source/drain terminal of the access transistor AT1 may be connected to the overlying bit line BL1 through the conductive via 550 standing on the source/drain contact 524 and a conductive via 578 laid in the second sub-layout 500-2. Similarly, the gate structure 502 of the access transistor AT2 at the ground level may be connected to the word line WL through the conductive via 544 standing on the gate structure 502 and a conductive via 580 laid in the second sub-layout 500-2. Also, the source/drain contact 514 as the unshared source/drain terminal of the access transistor AT2 may be connected to the overlying bit line BL2 through the conductive via 548 standing on the source/drain contact 514 and a conductive via 582 laid in the second sub-layout 500-2.

Although not shown, the pull up transistors PU1, PU2 at the elevated level may be embedded in a dielectric layer similar to the dielectric layer 128 described with reference to FIG. 1B and FIG. 2D. In addition, an interconnection structure may be further formed on the pull up transistors PU1, PU2 and the surrounding dielectric layer. Multiple metallization tiers including the word line WL and the bit lines BL1, BL2 may be embedded in the interconnection structure. As a possible configuration, the word line WL may be formed in one of the metallization tiers, and the bit lines BL1, BL2 intersected with the word line WL may be formed in another one of the metallization tiers.

As above, a memory device including a CFET having vertically stacked NFET and PFET is provided. In some embodiments, the CFET is used as an access transistor coupled to a storage device in a non-volatile memory cell, for ensuring sufficient writing ability during each of set and reset operations. In further embodiments, cross-coupled inverters in a SRAM cell are each provided by a CFET, for significantly reducing footprint area of the SRAM cell.

The gate all around (GAA) transistor structures may be patterned by any suitable method. For example, the structures may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the GAA structure.

In an aspect of the present disclosure, a memory device is provided. The memory device comprises: a non-volatile storage device, with a first terminal coupled to a bit line; and an access transistor, configured to control electrical connection between a second terminal of the non-volatile storage device and a source line, and comprising an N-type field effect transistor (NFET) and a P-type field effect transistor (PFET) stacked on the NFET, wherein a common source/drain terminal of the NFET and the PFET is coupled to the second terminal of the non-volatile storage device, another common source/drain terminal of the NFET and the PFET is coupled to the source line, and gate terminals of the NFET and the PFET are coupled to different word lines.

In another aspect of the present disclosure, a memory device is provided. The memory device comprises: a first gate structure, a first channel structure and a pair of first source/drain contacts, deployed at a ground level on a semiconductor substrate, wherein the first channel structure laterally extends through the first gate structure and in lateral contact with the first source/drain contacts; a second gate structure, a second channel structure and a pair of second source/drain contacts, deployed at an elevated level over the semiconductor substrate, wherein the second channel structure laterally extends through the second gate structure and in lateral contact with the second source/drain contacts, and the second source/drain contacts are electrically connected to the first source/drain contacts, respectively; and a non-volatile storage device, disposed on and electrically connected to one of the second source/drain contacts.

In yet another aspect of the present disclosure, a semiconductor die is provided. The semiconductor die comprises: central processing unit (CPU) cores; a non-volatile memory, comprising an array of cells each having a transmission gate and a storage device coupled to the transmission gate, wherein the transmission gate comprises vertically stacked N-type field effect transistor (NFET) and P-type field effect transistor (PFET); and a cache memory, comprising an array of cells each having cross-coupled first and second inverters, wherein each of the first and second inverters comprises vertically stacked NFET and PFET.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a first gate structure, a first channel structure and a pair of first source/drain contacts, deployed at a ground level on a semiconductor substrate, wherein the first channel structure laterally extends through the first gate structure and in lateral contact with the first source/drain contacts, each of the first source/drain contacts comprises a first epitaxial structure contacting a sidewall of the first channel structure, and a first contact structure covering the first epitaxial structure, and the first contact structure is formed to a height substantially levelled with a top end of the first gate structure;
   a second gate structure, a second channel structure and a pair of second source/drain contacts, deployed at an elevated level over the semiconductor substrate, wherein the second channel structure laterally extends through the second gate structure and in lateral contact with the second source/drain contacts, and the second source/drain contacts are electrically connected to the first source/drain contacts, respectively, each of the second source/drain contacts comprises a second epitaxial structure contacting a sidewall of the second channel structure, and a second contact structure covering the second epitaxial structure, and the second contact structure is formed to a height substantially levelled with a top end of the second gate structure; and
   a non-volatile storage device, disposed on and electrically connected to one of the second source/drain contacts.

2. The memory device according to claim 1, wherein the second gate structure overlaps the first gate structure, the second channel structure overlaps the first channel structure, and the second source/drain contacts overlap the first source/drain contacts, respectively.

3. The memory device according to claim 1, wherein the first and second channel structures respectively comprise vertically separated semiconductor thin sheets.

4. The memory device according to claim 1, wherein the first and second gate structures are electrically connected to different word lines running at a further elevated level over the semiconductor substrate.

5. The memory device according to claim 1, wherein the non-volatile storage device with a terminal electrically connected to the one of the second source/drain contacts has another terminal electrically connected to a bit line running at a further elevated level over the semiconductor substrate.

6. The memory device according to claim 1, further comprising:
   a buried power rail, embedded in an isolation structure formed into the semiconductor substrate, and electronically connected to one of the first source/drain contacts not electrically connected to the non-volatile storage device.

7. The memory device according to claim 1, further comprising:
   an insulating spacer layer, separating the second gate structure, the second channel structure and the second source/drain contacts at the elevated level from the first gate structure, the first channel structure and the second source/drain contacts at the ground level.

8. The memory device according to claim 1, further comprising:
   a first dummy gate structure, disposed at the ground level and substantially parallel to the first gate structure, wherein one of the first source/drain contacts is located between the first gate structure and the first dummy gate structure; and
   a second dummy gate structure, disposed at the elevated level and overlapping the first dummy gate structure.

9. The memory device according to claim 1, further comprising:
   an additional first gate structure and an additional first source/drain contact, disposed at the ground level, wherein the first channel structure extends through the first gate structure and the additional first gate structure, the first source/drain contacts and the additional first source/drain contact are located at breaks of the first channel structure, and the additional first gate structure extends between one of the first source/drain contacts and the additional first source/drain contact; and
   an additional second gate structure and an additional second source/drain contact, disposed at the elevated level, wherein the second channel structure extends through the second gate structure and the additional second gate structure, the second source/drain contacts and the additional second source/drain contact are located at breaks of the second channel structure, the additional second gate structure extends between one of the second source/drain contacts and the additional second source/drain contact, and the additional second source/drain contact is electrically connected to the additional first source/drain contact.

10. The memory device according to claim 9, wherein the first gate structure and the additional first gate structure are electrically connected to a first word line, and the second gate structure as well as the additional second gate structure are electrically connected to a second word line.

11. The memory device according to claim 9, wherein the additional first source/drain contact and the additional second source/drain contact are electrically connected to a buried power rail embedded in an isolation structure formed into the semiconductor substrate.

12. A semiconductor die, comprising:
   central processing unit (CPU) cores;
   a non-volatile memory, comprising an array of cells each having a transmission gate and a storage device coupled to the transmission gate, wherein the transmission gate comprises vertically stacked N-type field effect transistor (NFET) and P-type field effect transistor (PFET), wherein
   the NFET comprises:
   a first gate structure, a first channel structure and a pair of first source/drain contacts, deployed at a ground level on a semiconductor substrate, wherein the first channel structure laterally extends through the first gate structure and in lateral contact with the first source/drain contacts; and
an additional first gate structure and an additional first source/drain contact, disposed at the ground level, wherein the first channel structure extends through the first gate structure and the additional first gate structure, the first source/drain contacts and the additional first source/drain contact are located at breaks of the first channel structure, and the additional first gate structure extends between one of the first source/drain contacts and the additional first source/drain contact; and
the PFET comprises:
a second gate structure, a second channel structure and a pair of second source/drain contacts, deployed at an elevated level over the semiconductor substrate, wherein the second channel structure laterally extends through the second gate structure and in lateral contact with the second source/drain contacts, the second source/drain contacts are electrically connected to the first source/drain contacts, respectively, and the storage device is a non-volatile storage device disposed on and electrically connected to one of the second source/drain contacts; and
an additional second gate structure and an additional second source/drain contact, disposed at the elevated level, wherein the second channel structure extends through the second gate structure and the additional second gate structure, the second source/drain contacts and the additional second source/drain contact are located at breaks of the second channel structure, the additional second gate structure extends between one of the second source/drain contacts and the additional second source/drain contact, and the additional second source/drain contact is electrically connected to the additional first source/drain contact; and
a cache memory, comprising an array of cells each having cross-coupled first and second inverters, wherein each of the first and second inverters comprises vertically stacked NFET and PFET.

13. The semiconductor die according to claim 12, wherein the cache memory is powered by buried power rails embedded in an isolation structure formed into a semiconductor substrate supporting the semiconductor die.

14. The semiconductor die according to claim 12, wherein source lines connected to the cells of the non-volatile memory are provided by buried power rails embedded in an isolation structure formed into a semiconductor substrate as a base layer of the semiconductor die, and bit lines connected to the cells of the non-volatile memory run over the cells of the non-volatile memory.

15. A memory device, comprising:
first channel layers;
a first source/drain contact and a second source/drain contact disposed at opposite sidewalls of one or more of the first channel layers;
a first gate electrode surrounding the first channel layers at a ground level on a semiconductor substrate;
second channel layers;
a third source/drain contact and a fourth source/drain contact disposed at opposite sidewalls of one or more of the second channel layers, wherein the second channel layers, the third source/drain contact and the fourth source/drain contact are disposed over the first channel layers, the first source/drain contact, and the second source/drain contact respectively, and the third source/drain contact and the fourth source/drain contact are electrically connected to the first source/drain contact and the second source/drain contact respectively;
a second gate electrode surrounding the second channel layers at an elevated level over the semiconductor substrate;
a fifth source/drain contact and a third gate electrode disposed at the ground level, wherein the first gate electrode and the third gate electrode are respectively penetrated through by the first channel layers, the first source/drain contact, the second source/drain contact and the fifth source/drain contact are disposed at breaks of the first channel layers, and the third gate electrode is disposed between the second source/drain contact and the fifth source/drain contact;
a sixth source/drain contact and a fourth gate electrode disposed at the elevated level, wherein the second gate electrode and the fourth gate electrode are penetrated through by the second channel layers, the third source/drain contact, the fourth source/drain contact and the sixth source/drain contact are disposed at breaks of the second channel layers, the fourth gate electrode is disposed between the fourth source/drain contact and the sixth source/drain contact, and the sixth source/drain contact is electrically connected to the fifth source/drain contact; and
a non-volatile storage device, disposed on and electrically connected to the fourth source/drain contact.

16. The memory device according to claim 15, further comprising
a first sidewall spacer disposed at opposite sidewalls of the first gate electrode and the third gate electrode; and
a second sidewall spacer disposed at opposite sidewalls of the second gate electrode and the fourth gate electrode.

17. The memory device according to claim 16, wherein portions of the first channel layers extending between the first gate electrode and the first source/drain contact are wrapped around by the first sidewall spacer; and
portions of the second channel layers extending between the second gate electrode and the third source/drain contact are wrapped around by the second sidewall spacer.

18. The memory device according to claim 15, wherein the first gate electrode and the third gate electrode are disposed between the first source/drain contact and the fifth source/drain contact and the first source/drain contact and the fifth source/drain contact are electrically connected to a buried power rail embedded in an isolation structure formed into the semiconductor substrate.

19. The memory device according to claim 15, wherein the first gate electrode and the third gate electrode are connected to a first word line, and the second gate electrode and the fourth gate electrode are connected to a second word line, different from the first word line.

20. The memory device according to claim 15, wherein the second source/drain contact is electrically connected to the fourth source/drain contact.

* * * * *